(12) United States Patent
Levesque et al.

(10) Patent No.: US 9,928,700 B1
(45) Date of Patent: Mar. 27, 2018

(54) METHOD AND APPARATUS FOR CONTROLLING GENERATION OF ELECTROSTATIC FRICTION EFFECTS FOR A PLURALITY OF ELECTRODES

(71) Applicant: Immersion Corporation, San Jose, CA (US)

(72) Inventors: Vincent Levesque, Montreal (CA); Juan Manuel Cruz-Hernandez, Montreal (CA); Mohammadreza Motamedi, Montreal (CA); Kaniyalal Shah, Fremont, CA (US); Ali Modarres, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/415,137

(22) Filed: Jan. 25, 2017

(51) Int. Cl.
  *H04B 3/36* (2006.01)
  *G08B 6/00* (2006.01)
  *G06F 3/01* (2006.01)

(52) U.S. Cl.
  CPC .............. *G08B 6/00* (2013.01); *G06F 3/016* (2013.01)

(58) Field of Classification Search
  CPC combination set(s) only.
  See application file for complete search history.

(56) References Cited

U.S. PATENT DOCUMENTS

| | | | |
|---|---|---|---|
| 8,941,475 B2 | 1/2015 | Makinen et al. | |
| 9,330,544 B2 * | 5/2016 | Levesque | G08B 6/00 |
| 9,383,821 B2 | 7/2016 | Wakuda et al. | |
| 9,383,822 B2 | 7/2016 | Wakuda et al. | |
| 9,417,694 B2 | 8/2016 | Birnbaum et al. | |
| 2014/0139450 A1* | 5/2014 | Levesque | G08B 6/00 345/173 |
| 2015/0268723 A1* | 9/2015 | Saboune | G06F 3/016 345/156 |
| 2016/0004309 A1 | 1/2016 | Modarres et al. | |
| 2016/0216765 A1* | 7/2016 | Levesque | G08B 6/00 |
| 2017/0053502 A1* | 2/2017 | Shah | G08B 6/00 |
| 2017/0090577 A1* | 3/2017 | Rihn | A63F 13/285 3/285 |
| 2017/0173457 A1* | 6/2017 | Rihn | G06F 3/011 |

* cited by examiner

Primary Examiner — Travis Hunnings
(74) Attorney, Agent, or Firm — Medler Ferro Woodhouse & Mills PLLC

(57) ABSTRACT

An interface device configured to provide an electrostatic friction (ESF) effect is disclosed. The interface device comprises a plurality of electrodes disposed at a surface of the interface device. It further comprises a signal generating circuit configured to generate a first drive signal at an output of the signal generating circuit, and comprises a plurality of frequency filter units or delay elements electrically connected to the signal generating circuit and to the plurality of electrodes. The interface device further comprises a control unit configured to use the plurality of frequency filter units or delay elements: (i) to cause only a subset of one or more electrodes of the plurality of electrodes to output one or more respective ESF effects with the first drive signal, or (ii) to cause at least two electrodes to output respective ESF effects with the first drive signal in different respective manners.

18 Claims, 18 Drawing Sheets

METHOD AND APPARATUS FOR CONTROLLING GENERATION OF ELECTROSTATIC FRICTION EFFECTS FOR A PLURALITY OF ELECTRODES

FIELD OF THE INVENTION

The present invention is directed to a method and apparatus for controlling generation of electrostatic friction effects for a plurality of electrodes, and has application in wearables, user interfaces, gaming, automotive, virtual reality or augmented reality, and consumer electronics.

BACKGROUND

As computer-based systems become more prevalent, the quality of the interfaces through which humans interact with these systems is becoming increasingly important. Haptic feedback, or more generally haptic effects, can improve the quality of the interfaces by providing cues to users, providing alerts of specific events, or providing realistic feedback to create greater sensory immersion within a virtual environment.

Examples of haptic effects include kinesthetic haptic effects (such as active and resistive force feedback), vibrotactile haptic effects, and electrostatic friction haptic effects. In electrostatic friction haptic effects, a current may be provided to an electrode. The electrode may then exert an attractive force on the skin of a user, who may perceive this force as electrostatic friction.

SUMMARY

One aspect of the embodiments herein relates to an interface device configured to provide an electrostatic friction (ESF) effect. The interface device comprises a plurality of electrodes, a signal generating circuit, a plurality of frequency filter units or delay elements, and a control unit. The plurality of electrodes are disposed at a surface of the interface device. The signal generating circuit is configured to generate a first drive signal at an output of the signal generating circuit. The plurality of frequency filter units or delay elements are electrically connected to the signal generating circuit and to the plurality of electrodes, such that each electrode of the plurality of electrodes is electrically connected to an output of a respective frequency filter unit or delay element. An input of the respective frequency filter unit or delay element is electrically connected to the output of the signal generating circuit. The control unit is configured to use the plurality of frequency filter units or delay elements: (i) to cause only a subset of one or more electrodes of the plurality of electrodes to output one or more respective ESF effects with the first drive signal, or (ii) to cause at least two electrodes of the plurality of electrodes to output respective ESF effects with the first drive signal in different respective manners.

In an embodiment, the interface device comprises the plurality of frequency filter units. Each of the plurality of frequency filter units has a respective pass-through frequency band or a respective set of pass-through frequency bands, and is configured to block any frequency component of the first drive signal which is outside the respective pass-through frequency band or respective set of pass-through frequency bands. The respective pass-through frequency bands or respective sets of pass-through frequency bands of the plurality of frequency filter units do not overlap in frequency, or only partially overlap in frequency.

In an embodiment, the control unit is configured to cause the signal generating circuit to generate the first drive signal with only a frequency component that is (i) within the respective pass-through frequency band or respective set of pass-through frequency bands of a respective frequency filter unit of a first electrode and (ii) outside the respective pass-through frequency bands or respective sets of pass-through frequency bands of the remainder of the plurality of frequency filter units of the remainder of the plurality of electrodes of the interface device, such that the plurality of frequency filter units causes only the first electrode of the plurality of electrodes to output an ESF effect with the first drive signal.

In an embodiment, each of the plurality of frequency filter units has only a single respective pass-through frequency band, and the respective pass-through frequency bands of the plurality of frequency filter units do not overlap in frequency, or each of the plurality of frequency filter units has a respective set of pass-through frequency bands, and the respective sets of pass-through frequency bands of the plurality of frequency filter units have partial overlap in frequency.

In an embodiment, the plurality of frequency filter units comprise a first frequency filter unit configured to pass the first drive signal to a first electrode of the plurality of electrodes with a first attenuation level, and comprises a second frequency filter unit configured to pass the first drive signal to a second electrode of the plurality of electrodes with a second attenuation level different than the first attenuation level. The interface device is configured to cause the first electrode and the second electrode to output respective ESF effect with the first drive signal with different respective intensity levels.

In an embodiment, the plurality of frequency filter units comprise a first frequency filter unit configured to pass the first drive signal to a first electrode of the plurality of electrodes with a first phase shift that creates a first period of delay, and comprises a second frequency filter unit configured to pass the first drive signal to a second electrode of the plurality of electrodes with a second phase shift that creates a second period of delay different than the first period of delay, and wherein the interface device is configured to cause the first electrode and the second electrode to output respective ESF effects with the first drive signal at different respective times.

In an embodiment, the control unit is configured to determine a spatial relationship between the interface device and a determined location, or to determine a temporal relationship between a current time and a determined event, and is configured to select the subset of one or more electrodes to convey the spatial relationship or the temporal relationship.

In an embodiment, the interface device comprises the plurality of frequency filter units. The first drive signal is one of a plurality of drive signals the signal generating circuit is configured to generate in different respective time periods or in response to different signal generating commands. The control unit is configured to cause the plurality of frequency filter units to pass the plurality of drive signals to different respective electrodes of the plurality of electrodes.

In an embodiment, the plurality of electrodes are arranged as an array. The control unit is configured to use the plurality of frequency filter units to cause the array of electrodes to sequentially output respective ESF effects with the respective drive signals to create an impression of flow along the array of electrodes.

In an embodiment, the interface device comprises the plurality of delay elements, wherein the plurality of delay elements are configured to control a timing by which each electrode of the plurality of electrodes will output an ESF effect by introducing different respective periods of delay of the first drive signal from an input of the respective delay element to an output of the respective delay element.

In an embodiment, the plurality of electrodes is arranged in an array in which the plurality of electrodes has uniform spacing between adjacent electrodes.

In an embodiment, the array is a two-dimensional array.

In an embodiment, the interface device is a wearable device.

In an embodiment, the signal generating circuit comprises an amplifier circuit configured to amplify a first signal to the first drive signal, wherein the amplifier circuit is the only amplifier circuit in the interface device for amplifying the first signal to the first drive signal.

In an embodiment, the control unit is configured to select the subset of one or more electrodes from among a set of electrodes of the plurality of electrodes that are receiving user contact, such that some electrodes receiving user contact are not selected to generate a respective static ESF effect with the first drive signal.

One aspect of the embodiments herein relates to an interface device configured to provide an electrostatic friction (ESF) effect. The interface device comprises a signal generating circuit, a plurality of delay elements, and a plurality of electrodes. The signal generating circuit is configured to generate a first drive signal at an output of the signal generating circuit. The plurality of delay elements are configured to introduce respective periods of delay to the first drive signal from an input of the respective delay element to an output of the respective delay element. The plurality of electrodes correspond to the plurality of delay elements, wherein each of the plurality of electrodes is connected to an output of a respective delay element and is configured to generate a respective ESF effect with the first drive signal. The plurality of delay elements and their respective electrodes form a plurality of respective pairs that each includes a respective delay element and a respective electrode. The plurality of pairs of delay elements and their respective electrodes are electrically connected in series such that an input of a delay element of a first pair in the series is connected to an output of the signal generating circuit, and an input of a delay element of all other pairs in the series is electrically connected to an electrode of a previous pair in the series.

In an embodiment, the respective periods of delay introduced by the plurality of delay elements are the same.

In an embodiment, the respective periods of delay introduced by the plurality of delay elements are all different.

Features, objects, and advantages of embodiments hereof will become apparent to those skilled in the art by reading the following detailed description where references will be made to the appended figures.

BRIEF DESCRIPTION OF THE DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION

Figure 1A:
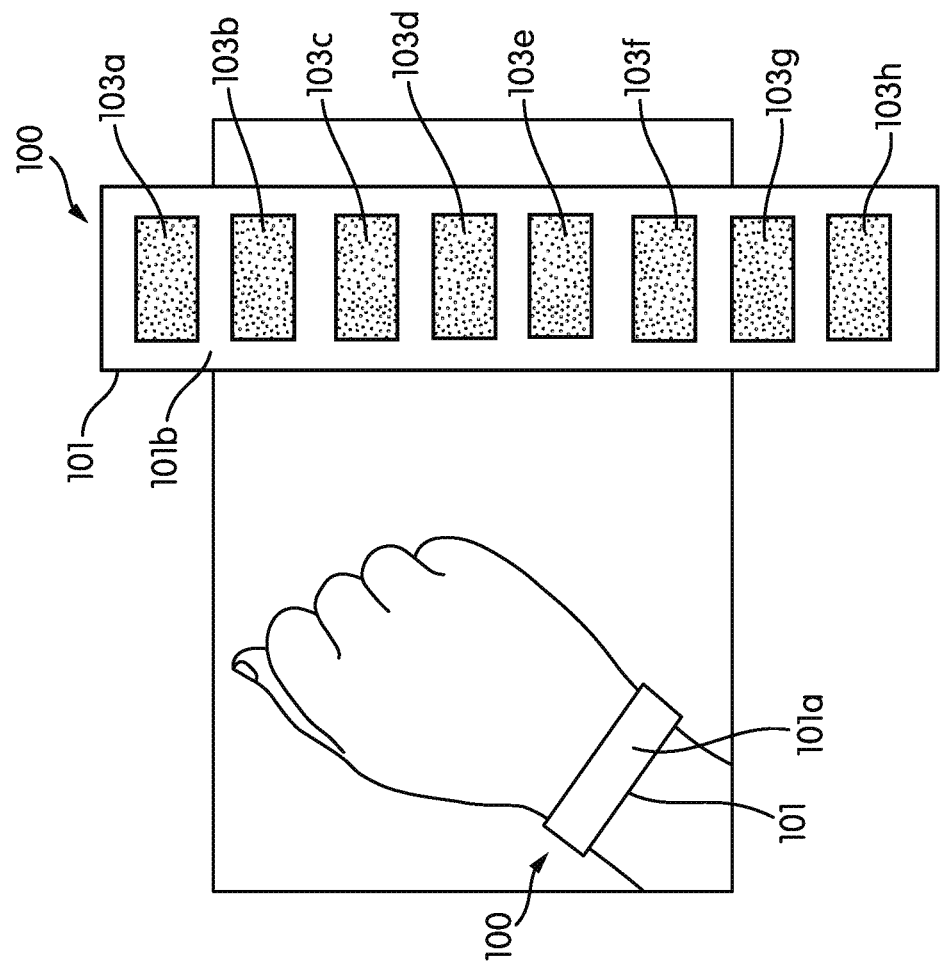
FIG. 1A is a depiction of a wearable device having a plurality of electrodes disposed at an outer surface thereof to generate electrostatic friction effects, according to an embodiment herein.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments hereof relate to implementing a haptic enabled interface device (e.g., a handheld or otherwise graspable device such as a mobile device or game console controller, a wearable device, a laptop) which includes a plurality of electrodes for producing (e.g., generating) electrostatic friction (ESF) effects, and is configured to control which subset of one or more electrodes will generate one or more respective ESF effects with a drive signal, and/or is configured to vary how different electrodes generate respective ESF effects with the drive signal. For example, the haptic enabled interface device may include frequency filter units or relay switches which are configured to block the drive signal from reaching certain electrodes, or include shielding elements which are configured to electrically shield those electrodes from a surface of the device, so that those electrodes do not generate any ESF effect with the drive signal at the surface. In another example, the haptic enabled interface device may be configured to pass a drive signal to multiple electrodes, but may attenuate or delay the drive signal by different amounts/periods for different electrodes, so that the different electrodes generate respective ESF effects with the drive signal in different manners. The frequency filter units, delay elements, and relay switches may be different types of gating elements.

In an embodiment, the haptic enabled interface device may be configured to control which electrodes output respective ESF effects with a drive signal and/or how those electrodes output the ESF effects with the drive signal in order to convey a spatial relationship, a temporal relationship, a spatio-temporal relationship (e.g., a combination of a spatial relationship and a temporal relationship), and/or other information to a user. In an embodiment, the plurality of electrodes may sequentially output respective ESF effects to create an impression of flow along the electrodes. For instance, if the electrodes are arranged in a one-dimensional array (e.g., a line) or a two-dimensional array, the sequential output of the respective ESF effects along the array may create an impression of flow along the array. This impression of flow may be used to provide navigation instructions for a user, indicate progress of an operation, a passage of time, or for any other purpose.

In an embodiment, the plurality of electrodes may be used to produce (e.g., generate) static ESF effects. As discussed in more detail below, dynamic ESF effects may require a user to move a part of his or her body (e.g., finger tip) across an electrode, while static ESF effects allow the user's body (e.g., finger tip) to remain stationary. In some cases, static ESF effects may use a much higher voltage (e.g., 1.5 kV) than that used with dynamic ESF effects (e.g., 10 V). Thus, in some instances, a signal generating circuit of the haptic enabled device may use one or more amplifier circuits that include high-voltage electronics to generate a high-voltage drive signal for static ESF. For example, the drive signal may be an amplified signal with an amplitude (e.g., >1 kV) suitable for static ESF effects. In an embodiment, the haptic enabled interface device may include multiple amplifier circuits, with one amplifier circuit assigned to each electrode, so that the output of ESF effects can be separately controlled at each individual electrode. In another embodiment, the haptic enabled interface device may include only one amplifier circuit for generating any drive signal. The sole amplifier circuit may be included in the signal generating circuit. In this embodiment, the amplifier circuit outputs a drive signal that can be shared among the plurality of electrodes, which may produce respective ESF effects using the same drive signal. For instance, a plurality of individually controllable gating elements (e.g., switches, frequency filter units, or delay elements) may be placed between the single amplifier circuit and the respective electrodes to control ESF effects at those electrodes, or a plurality of shielding elements may be placed between the respective electrodes and a ground potential to control ESF effects at those electrodes. The gating elements or shielding elements may, e.g., cause only a subset of one or more electrodes of a plurality of electrodes to output respective one or more ESF effects with a first drive signal, or may cause at least two electrodes of the plurality of electrodes to output respective ESF effects with the first drive signal, but to do so in different manners. In another instance, a plurality of delay elements may be arranged in a series configuration to form a chain of delay elements, with each delay element gating a respective electrode. This series arrangement may cause a drive signal to sequentially propagate through the chain of delay elements and their respective electrodes to create the impression of flow, for instance.

Figure 1B:
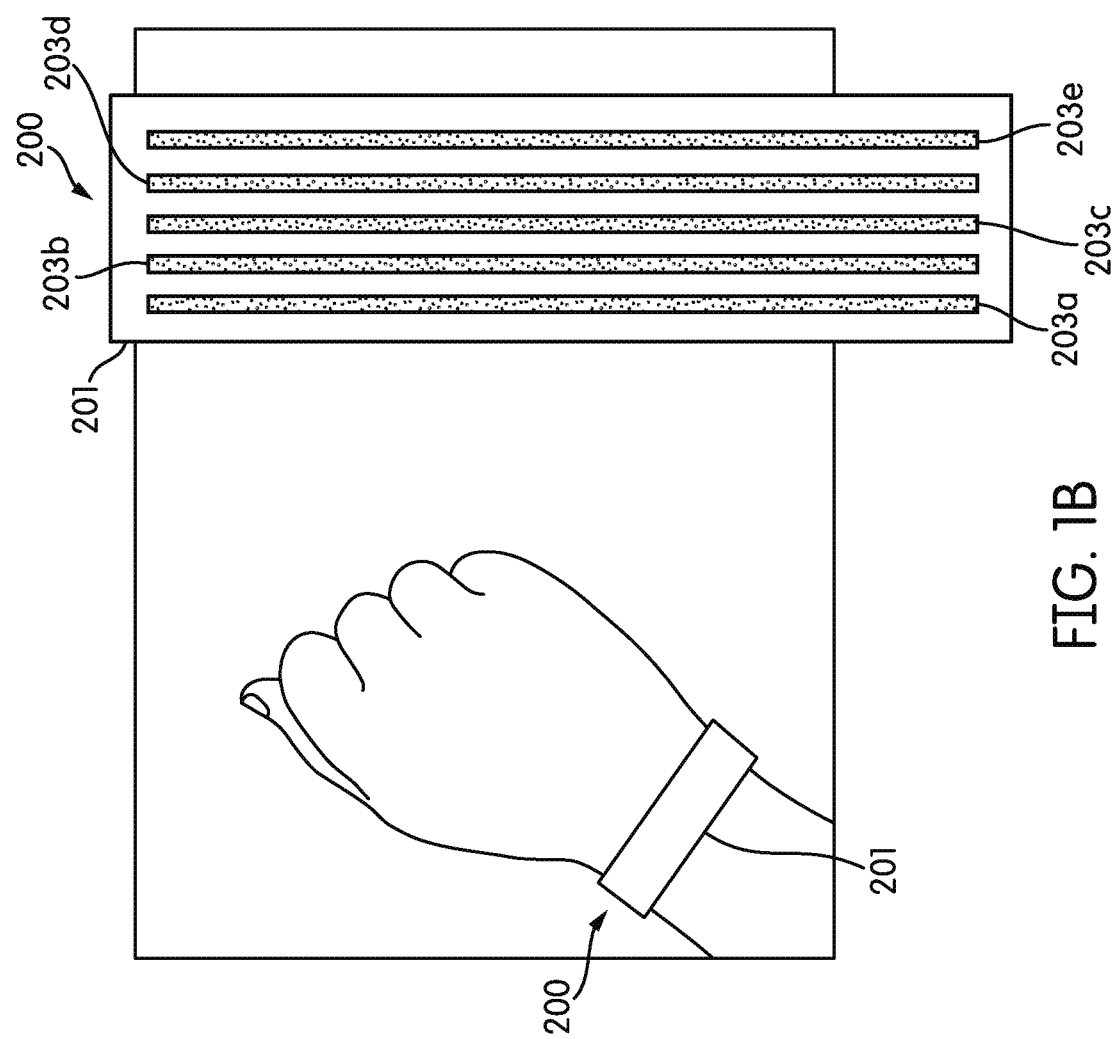
FIG. 1B is a depiction of a wearable device having a plurality of electrodes disposed at an outer surface thereof to generate electrostatic friction effects, according to an embodiment herein.

FIGS. 1A and 1B are depictions of a wearable interface device (e.g., an activity tracker wristband or smart watch) configured to provide an electrostatic friction (ESF) effect to a user. FIG. 1A depicts a wearable interface device 100 that has a band 101 with a first surface 101a and a second, opposite surface 101b. The first surface 101a may, e.g., be a top outer surface intended to be visible and/or accessible when worn, and the second surface 101b may be, e.g., a bottom outer surface intended to contact a user's wrist when worn. The second surface 101b may be referred to as a contact surface. In FIG. 1A, the second surface 101b of the band 101 may have a plurality of electrodes 103a-103h disposed at the surface 101b. In an embodiment, the first surface 101a may have a display device (e.g., touch screen) and/or a physical user input component (e.g., a button) mounted thereon, or may alternatively have none of those devices (e.g., as a simpler activity tracker). In an embodiment, the wearable interface device 100 may include another haptic device. For instance, the wearable interface device 100 may include a piezoelectric actuator embedded within the band 101 to produce a vibrotactile haptic effect for the whole band 101, or a layer of shape memory alloy disposed on the first surface 101a to produce a deformation haptic effect at the first surface 101a.

The electrodes used to produce ESF effects (which may be referred to as ESF electrodes) may have a variety of sizes and shapes, such as squares, dots, and strips. For instance, FIG. 1B depicts another wearable interface device 200 that has a plurality of electrodes 203a-203e on a band 201, which are different in size and shape than the electrodes 103a-103h in FIG. 1A. More specifically, the electrodes 203a-203e may each have the form of a long strip having a length substantially equal to a length of the band 201. In some cases, an electrode shaped as a long strip may be more advantageous compared to some other shapes because an ESF effect for some users may be more optimal when their skin does not completely cover an electrode. An electrode having the long strip shape may be less likely to be completely covered by the skin of a user. The electrodes in the embodiments herein may also be arranged in a variety of orientations. For instance, the electrodes 103a-103h may be lined up along a length of the band 101, while the electrodes 203a-203e may be rotated 90 degrees from as shown in FIG. 1B to be lined up along a width of the band 201. In an embodiment, these two orientations may be combined, with some electrodes lined up along a length of a band (FIG. 1B), while some electrodes are lined up along a width of the band.

As discussed above, the electrodes 103a-103h or the electrodes 203a-203e may be used to create spatial and/or temporal feedback, such as to create an impression of flow of ESF effects along the electrodes, or to convey a spatial direction for a user to follow. With respect to FIG. 1A, sequential ESF effects, or the flow of ESF effects, along the electrodes 103a-103h may be used to direct a user in a leftward direction of a rightward direction. With respect to FIG. 1B, sequential ESF effects, or the flow of ESF effects, along the electrodes 203a-203e may be used to direct a user in a forward or a backward direction. The arrangement of electrodes in FIG. 1A may be combined with the arrangement of electrodes in FIG. 1B to allow a haptic enabled interface device to direct a user in a forward, backward, leftward, or rightward direction.

In another example, the electrodes 103a-103h or the electrodes 203a-203e may be used to indicate a spatial orientation of the corresponding haptic enabled interface device (and of a user wearing the device) relative to a location of interest. For example, electrode 103d or 103e may be designated as a center electrode that represents a current location of the device, while electrode 103b may be determined to fall on a left side of the center electrode when the strap 101 is worn, and electrode 103g may be determined to fall on a right side of the center electrode when strap 101 is worn. When a desired destination or object is to the left of the device's current location, a drive signal may be directed to the electrode 103b to output an ESF effect. When the desired destination or object is to the right of the device's current location, the drive signal may be directed to the electrode 103g to output an ESF effect.

In another example, the electrodes 103a-103h may be used to convey a temporal relationship between a current time and an event of interest. For example, each of the electrodes 103a-103h may correspond to different amounts of time (e.g., 15 minutes, 30 minutes, etc.) before a meeting, and may be selectively activated to indicate a current duration of time before a meeting. In yet another example, the electrodes 103a-103h may be used to indicate progress of an operation, such as a data transfer operation. For instance, electrodes 103a-103h may correspond to different percentages (e.g., 0%, 10%, 20%, etc.), and may be selectively activated to indicate what percentage of the data transfer operation is currently complete.

Figure 2:
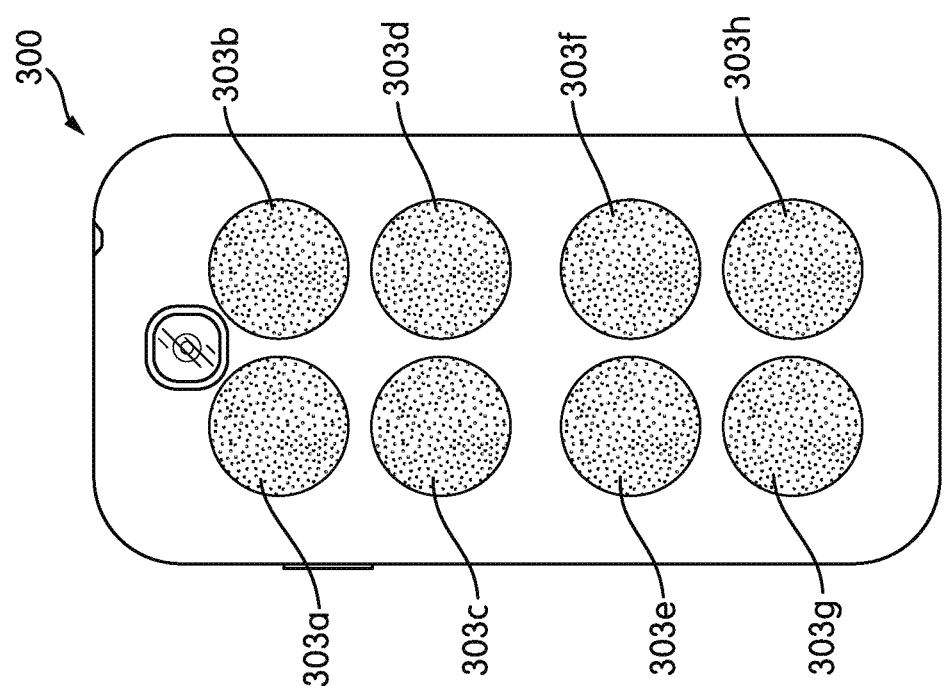
FIG. 2 is a depiction of a mobile device having a plurality of electrodes disposed at an outer surface thereof to generate electrostatic friction effects, according to an embodiment herein.
Figure 3:
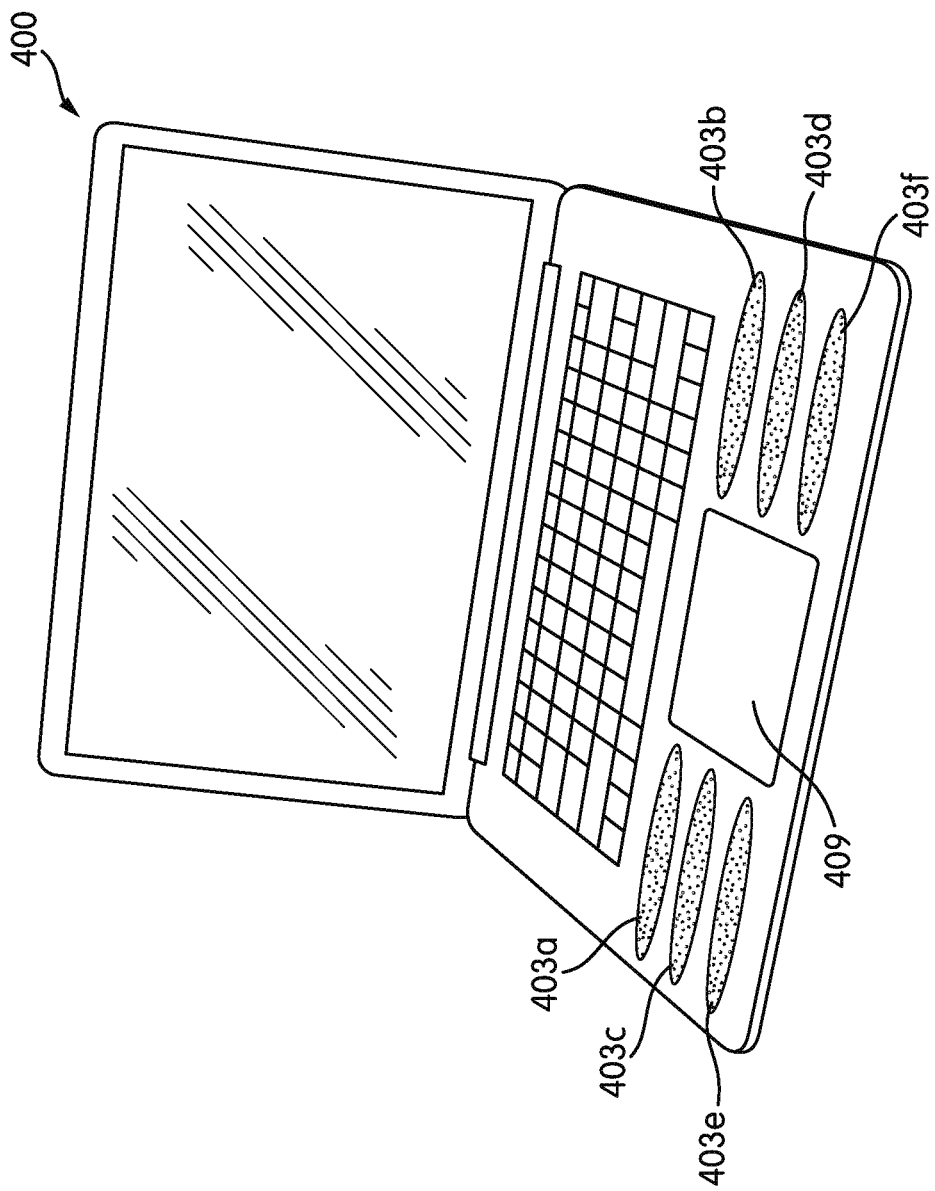
FIG. 3 is a depiction of a laptop having a plurality of electrodes disposed at an outer surface thereof to generate electrostatic friction effects, according to an embodiment herein.

FIGS. 2 and 3 depict examples of other interface devices having ESF electrodes for producing (e.g., generating) an ESF effect. FIG. 2 shows an example of a mobile interface device 300 (e.g., smartphone or tablet computer) having a plurality of electrodes 303a-303g disposed at a contact surface 301 (e.g., a back surface) thereof. The contact surface of the device 300 may be a surface that is expected to receive user contact from a hand when the device 300 is held by that hand. The electrodes 303a-303g may each be shaped as a circle (e.g., a dot), and may be arranged in a two-dimensional array (e.g., four rows by two columns). The electrodes may be placed, e.g., at locations on the contact surface 301 where a user's finger is most likely to touch when holding the mobile interface device 300. FIG. 3 depicts an example of a laptop 400 having a plurality of electrodes 403a-403f on a contact surface (e.g., palm rest, touch pad 409, hand print scanner) thereof. The contact surface of the device 400 may be a surface that is expected to receive user contact during typing or other use of the device 400. The electrodes 403a-403f may be arranged as a first one-dimensional array 413 and a second one-dimensional array 423. The first one-dimensional array 413 is located on one side of a touch pad 409, and the second one-dimensional array 423 is located on an opposite side of the touch pad 409. These locations may correspond to areas where a user's wrist is likely to come to rest and contact the laptop 400, allowing the ESF effect to be generated at the user's wrist. In an embodiment, the ESF electrodes described herein may be disposed at a surface of a display screen of device 300, device 400, or of any other device having a display screen. In an embodiment where a plurality of electrodes (e.g., 103a-103h) are arranged as an array, the plurality of electrodes may have uniform spacing between adjacent electrodes.

The electrodes 103a-103h, 203a-203e, 303a-303h, 403a-403f may be configured to generate an ESF effect, and may be referred to as ESF electrodes. In an embodiment, each electrode may be a conductive (e.g., metal) pad. In an embodiment, the plurality of electrodes 103a-103h, 203a-203e, 303a-303h, 403a-403f may be exposed electrodes and/or insulated electrodes. Some haptic enabled interface devices may include only exposed ESF electrodes, include only insulated ESF electrodes, or include a mixture of exposed ESF electrodes and insulated ESF electrodes. An exposed electrode may be disposed at a respective portion of a surface of an interface device (e.g., surface 101b), and more specifically may form the respective portion of the surface. The exposed electrode may, e.g., be configured to be directly electrically coupled to a user upon the user making contact with the exposed electrode (or disposed over the exposed electrode with only a very small air gap therebetween) at the respective portion of the surface. The contact may refer to contact with, e.g., the user's skin. More generally speaking, the contact may refer to contact in which a drive signal can create an electrostatic friction effect on the user's body. In one example, an exposed electrode may be a conductive pad adhered on top of a body of the interface device (e.g., on top of a body of band 101). In one example, the exposed electrode may be a conductive pad exposed through an opening in a body, a housing or other structural element of the interface device (e.g., through an opening in a casing of a mobile phone).

In an embodiment, an insulated electrode may be disposed at a respective portion of an outer surface (e.g., surface 101b) of an interface device, and more specifically may be disposed behind the respective portion of the outer surface. The insulated electrode may, e.g., be separated from the surface by a thin insulating layer, such as a layer of dielectric material. The insulated layer may be configured to be capacitively electrically coupled to a user upon the user making contact with the insulated electrode's respective portion of the surface. In one example, an insulated electrode may be embedded within a plastic outer cover of a mobile phone or game console controller, or embedded within a band of a smart watch, such that there is an electrically insulating material (e.g., a dielectric material) between the electrode and the outer surface of the mobile phone, game console controller, or smart watch. In another example, the insulated electrodes may be a conductive material placed on a body of the smart phone, smart watch, or game console controller, and may have then been covered with an insulating material (e.g., a layer of Kapton® tape).

In an embodiment, the multiple electrodes may be used, e.g., to generate a static ESF effect or a dynamic ESF effect. Dynamic ESF effects may involve exerting electrostatic forces on a finger or other part of the user's body while the finger or other part of the user's body is moving on a surface of the interface device. The electrostatic forces may be created by applying a time-varying signal to an electrode. The electrostatic forces may attract the finger, and may be perceived as friction during the movement of the finger. Static ESF effects may be generated while the user's finger or other body part remains stationary relative to and contacting a surface of the interface device. Static ESF effects may also involve applying a time-varying signal to an electrode to create electrostatic forces. In some cases, static ESF may involve a higher voltage level for the time-varying signal compared to that for dynamic ESF.

Figure 4A:
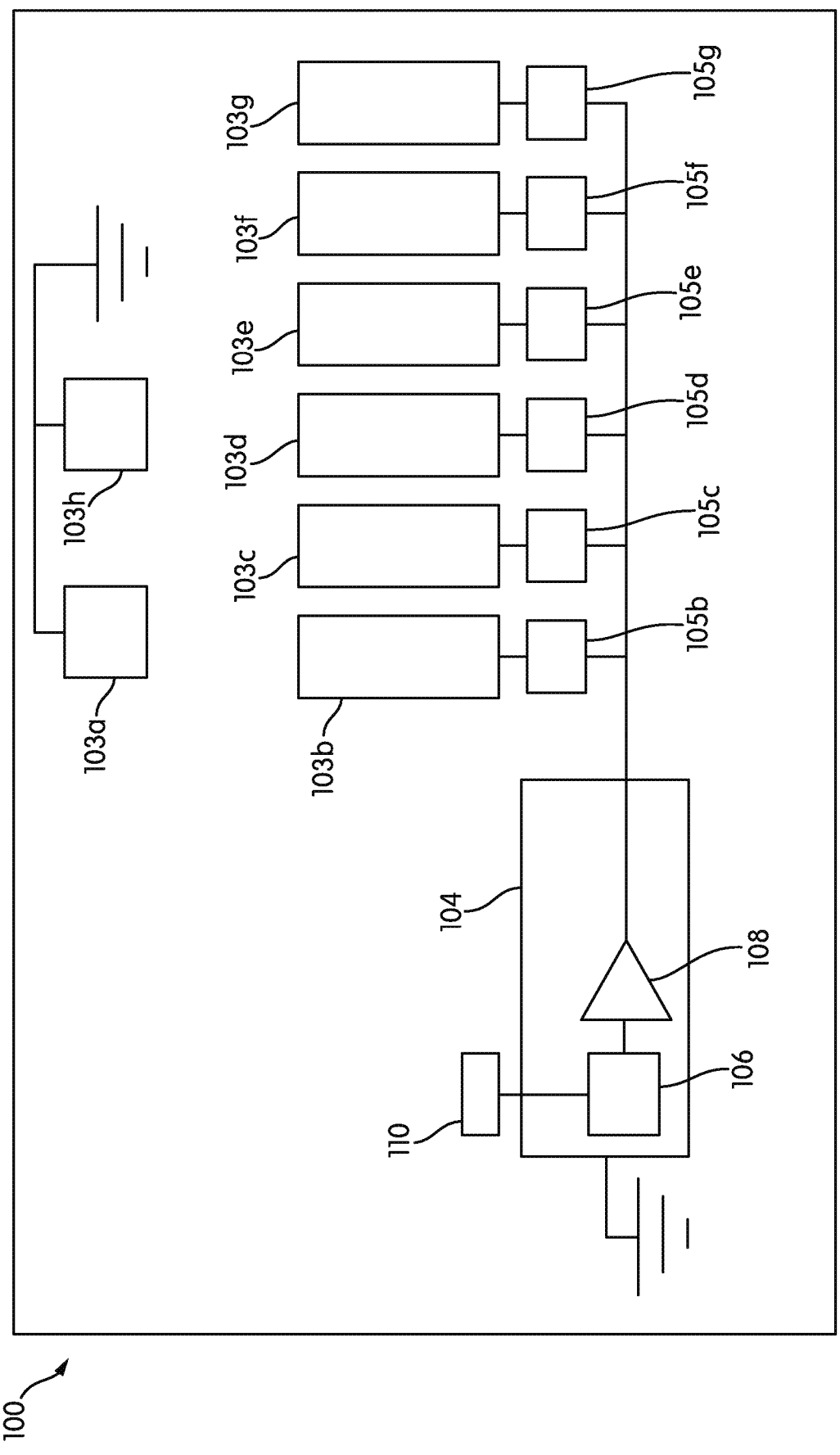
FIGS. 4A and 4B are schematic representations of a plurality of gating elements disposed between a driving circuit and respective electrodes, according to an embodiment herein.

In an embodiment, the handheld interface device 100 includes electrodes which are signal electrodes or switchable to being signal electrodes, and includes electrodes which are ground electrodes or switchable to being ground electrodes. For example, FIG. 4A shows an embodiment in which electrodes 103a and 103h are both ground electrodes, and electrodes 103b-103g are signal electrodes or switchable by gating elements 105b-105g to being signal electrodes. In an embodiment, a signal electrode may be an electrode that receives a drive signal from a signal generating circuit, and may be configured to produce an ESF effect with the drive signal. In an embodiment, a ground electrode may be an electrode electrically connected to a ground potential (e.g., a ground potential as being equal to a potential of a negative terminal of a battery or other power source of the interface device 100). Because electrodes 103a and 103h have a permanent electrical connection to ground, they may be referred to as dedicated ground electrodes in FIG. 4A. Because electrodes 103a and 103h are dedicated ground electrodes, they have no corresponding gating elements (i.e., no gating element 105) in FIG. 4A. Generally speaking, a gating element for an electrode may be an element (e.g., circuit) which controls whether a signal can reach the electrode, or a manner in which the signal reaches the electrode (e.g., a level of attenuation or amplification, or a period of delay). In some examples in which static ESF effects are generated, only an insulated electrode(s) is used as a signal electrode, while an insulated electrode or an exposed electrode (if any) may be used as a ground electrode. In some cases, an insulated electrode is switchable between being a signal electrode and a ground electrode (e.g., interchangeably used as a signal electrode at one point in time (a first instance) or as a ground electrode at another point in time (a second instance).

Returning to FIG. 4A, the figure is a schematic representation of the wearable interface device 100, which includes a signal generating circuit 104 that includes a signal processor 106 and an amplifier 108. The signal processor 106 may be configured to generate, e.g., a sinusoidal or other time-varying signal for producing an ESF effect. The signal generated by the signal processor 106 may be an analog or digital signal. In an embodiment, the interface device 100 may include a control unit 110 (e.g., a microprocessor or FPGA circuit) that is configured to control the signal generated by the signal processor 106. The amplifier 108 may be configured to amplify the signal from the signal processor 106 to generate a drive signal at an output of the signal generating circuit 104. For instance, the signal generated by the signal processor 106 may be a rectangular pulse having an amplitude that is in a range of 5 V to 10 V, and the amplifier 108 may amplify this signal to generate a drive signal that is a rectangular pulse with an amplitude of about 1 kV for producing a static ESF effect. In an embodiment, the amplifier 108 may be the only amplifier in the interface device 100 for amplifying any signal from the signal processor 106.

In an embodiment, the signal generating circuit 104 may output a first drive signal and a second drive signal which correspond to separate time periods, or separate signal generating commands. For example, a voltage waveform that is output by the signal generating circuit 104 in a first time period (e.g., first 1-second window) may be considered a first drive signal, while a voltage waveform that is output by the signal generating circuit 104 in a second time period (e.g., a subsequent 1-second window) may be considered a second drive signal. In another example, a voltage waveform that is output by the signal generating circuit 104 in response to a first signal generating command from a software application (e.g., device driver) or application programming interface (API) controlling control unit 110 may be considered a first drive signal, while a voltage waveform that is output by the signal generating circuit 104 in response to a second signal generating command may be considered a second drive signal. In an embodiment, a first electrode that receives a drive signal may be considered to be generating a first ESF effect, while a second electrode that receives the same drive signal may be considered to be producing a second ESF effect. The two electrodes may receive the same version of the drive signal (e.g., same intensity, same phase, and same frequency components) or different versions (e.g., different intensities, different phases, or different frequency components) of the same drive signal.

In an embodiment, a plurality of gating elements 105b-105g may be disposed between respective electrodes 103b-103g and an output of the signal generating circuit 104, to control which of the electrodes 103b-103g will be signal electrodes. Examples of a gating element include a frequency filter, a delay element, and a switch (e.g., a high-voltage relay switch or high-voltage transistor). The plurality of gating elements 105b-105g may be configured to control which electrode(s) of the electrodes 103b-103g will receive a drive signal from the output of the signal generating circuit 104, and/or control a manner in which the drive signal reaches an electrode, such as an attenuation level or period of delay (e.g., from a phase shift) of the drive signal in reaching the electrode. In an embodiment, the relay switches or high-voltage transistors may form a high-voltage multiplexer that electrically connect a drive signal to exactly one electrode of electrodes 103b-103g, which may be selected under software control.

Figure 4B:
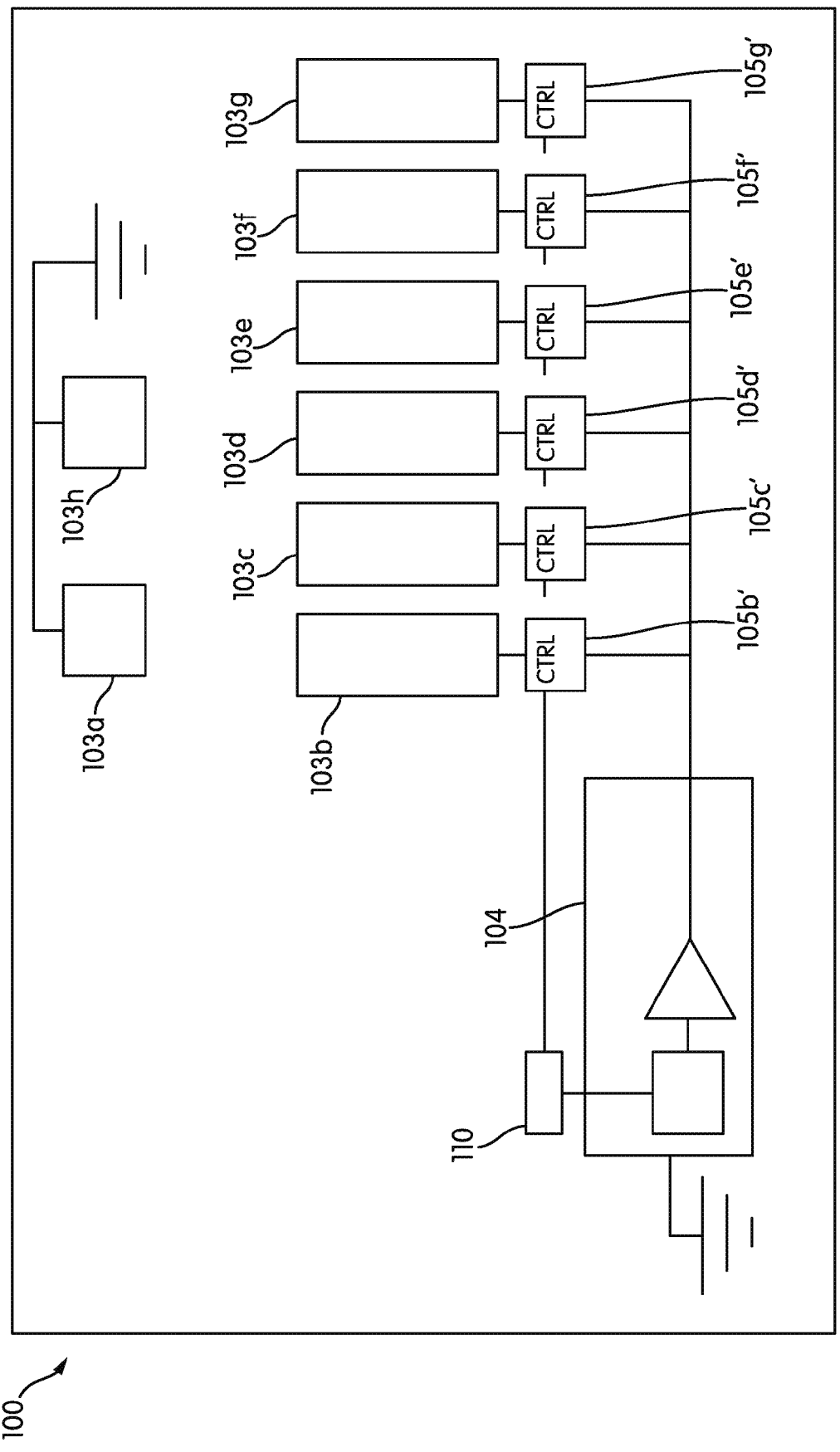

In FIG. 4A, the properties of the gating elements 105b-105g may be fixed. For instance, if the gating elements are frequency filters, each of the frequency filters may have a fixed pass-through frequency band(s). If the gating elements are delay elements, each of the delay elements may have a fixed time delay by which it delays a drive signal from the signal generating circuit 104. FIG. 4B depicts gating elements that are re-configurable. More specifically, FIG. 4B also depicts an interface device 100 having a plurality of gating elements 105b'-105g' disposed between an output of the signal generating circuit 104 and respective electrodes 103b-103g. In FIG. 4B, the properties of the gating elements 105b'-105g' may be reconfigured by the control unit 110 through respective CTRL input lines. For instance, if in an embodiment the gating elements are frequency filters, the control unit may be configured to communicate a command to a CTRL input line of at least one of the frequency filters to re-configure a pass-through frequency band(s) of the frequency filter. If in an embodiment the gating elements are delay elements, the control unit 110 may be configured to communicate a command to a CTRL input line of at least one of the delay elements to re-configure a period of delay that the delay element will introduce to a signal. If in an embodiment the gating elements are a plurality of switches (e.g., relay switches), the control unit 110 may be configured to control (e.g., open or close) each of the switches via respective CTRL input lines.

In an embodiment, the control unit 110 is configured to select a subset of one or more electrodes from the set of electrodes 103a-103h, or from the set of electrodes 103b-103g that are switchable to being signal electrodes, for outputting an ESF effect with a drive signal. The control unit may be configured to select a subset of one or more electrodes (e.g., 103b) from among a set of electrodes (e.g., 103b, 103c, 103d) that are receiving user contact, such that the electrodes receiving user contact are not selected to produce a respective static ESF effect with a drive signal.

Figure 5A:
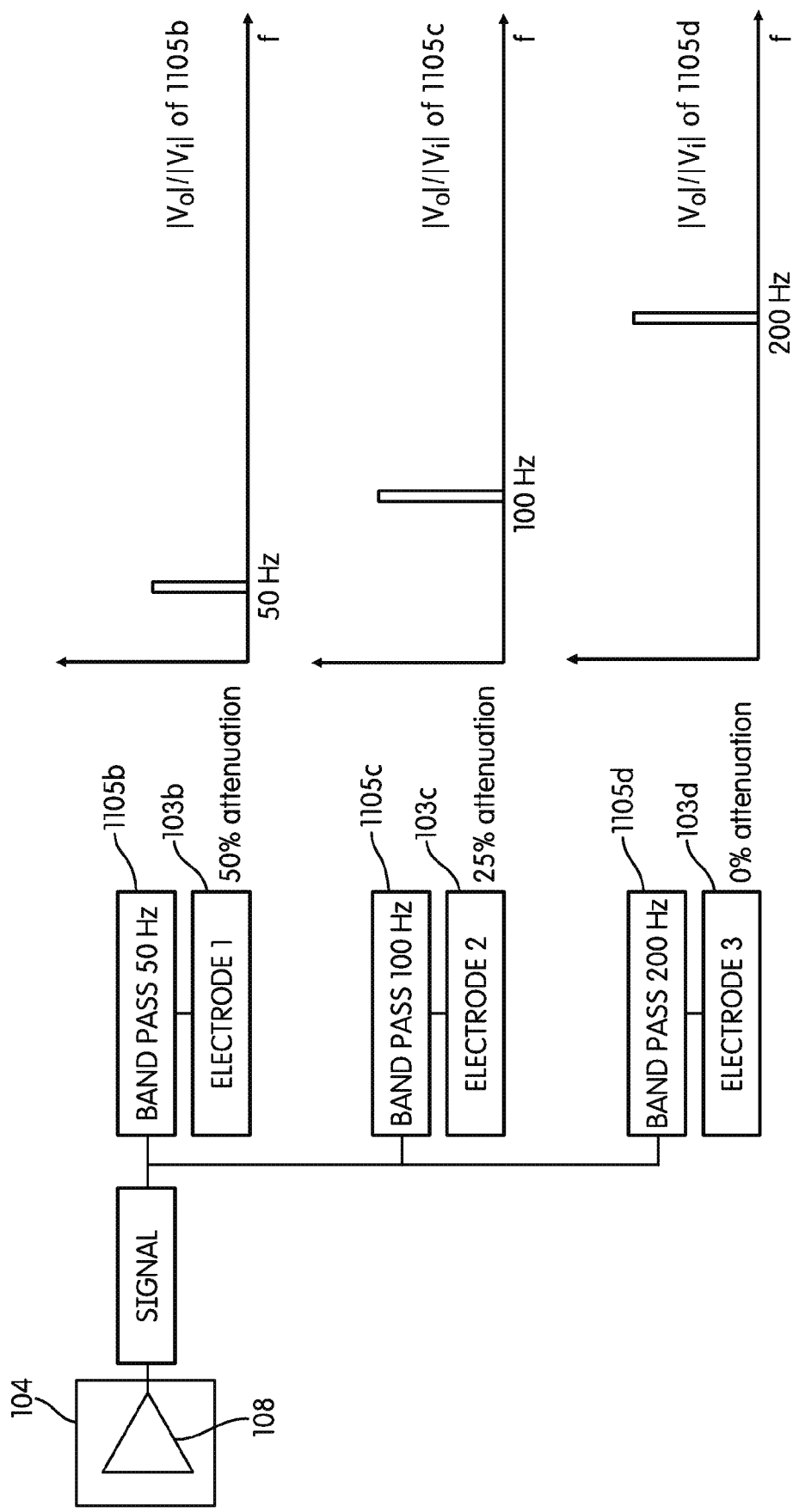
FIGS. 5A and 5B are schematic representations of a plurality of gating elements that are frequency filter units, according to an embodiment herein.

FIG. 5A is a schematic representation of an embodiment having gating elements that are a plurality of frequency filter units (e.g., analog or digital frequency filter units) 1105b, 1105c, 1105d, respectively. In an embodiment, each of the frequency filter units 1105b, 1105c, 1105d may be configured to have a different respective pass-through frequency band. As shown in FIG. 5A, frequency filter unit 1105b may have only a single pass-through frequency band that is centered around 50 Hz. Frequency filter unit 1105c may have only a single pass-through frequency band that is centered around 100 Hz. Frequency filter unit 1105d may have only a single pass-through frequency band that is centered around 200 Hz. Each of the frequency filter units 1105b, 1105c, and 1105d may be configured to block any frequency component of a drive signal which is outside of its respective pass-through frequency band. For instance, a drive signal which is a weighted sum of a 50 Hz sinusoidal signal and a 100 Hz sinusoidal signal will be blocked by frequency filter unit 1105d, because the frequency filter unit 1105d has only the single pass-through band centered around 200 Hz.

In an embodiment, a frequency filter unit may be configured to attenuate a frequency component of a signal that falls within a pass-through band of the frequency filter unit. For a drive signal that is a weighted sum of a 50 Hz sinusoidal signal and a 100 Hz sinusoidal signal, for example, the frequency filter unit 1105b may attenuate the 50 Hz sinusoidal signal by 50% (while completely blocking the 100 Hz component of the drive signal), and the frequency filter unit 1105c may attenuate the 100 Hz sinusoidal signal by 25% (while completely blocking the 50 Hz component of the drive signal). In an embodiment, each of the frequency filter units may be configured to introduce a phase shift into a frequency component of a signal that falls within a pass-through band of the frequency filter unit. The phase shift may introduce a delay by which the drive signal reaches a respective electrode connected to the frequency filter unit.

In an embodiment, the frequency filter units of a haptic enabled interface device may have pass-through bands with the same bandwidth, or with different respective bandwidths. In an embodiment, a bandwidth for each pass-through band may be nonzero (e.g., 20 Hz). In an embodiment, a bandwidth for a pass-through band may be small enough such that the pass-through band may be treated as a pass-through frequency (e.g., a pass-through frequency of 50 Hz, 100 Hz, or 200 Hz). The pass-through frequency may be associated with a digital frequency filter unit that performs digital signal processing (e.g., a Fourier transform) to perform filtering.

In the embodiment of FIG. 5A, the respective pass-through frequency bands of frequency filter units 1105b (one band centered around 50 Hz), 1105c (one band centered around 100 Hz), and 1105d (one band centered around 200 Hz) do not overlap. This embodiment allows the control unit 110 to create a first drive signal that reaches only one ESF electrode. For example, the control unit may cause the first drive signal to have a frequency component of only 50 Hz, such that only frequency filter unit 1105b will pass the first drive signal to electrode 103b, and only electrode 103b will produce or generate an ESF effect based on the first drive signal. However, the control unit may also cause a second drive signal in this embodiment to reach multiple electrodes, by including multiple frequency components (e.g., 50 Hz and 100 Hz) in the second drive signal. In another embodiment, the respective pass-through frequency bands of a plurality of frequency filter units may have some overlap.

Figure 5B:
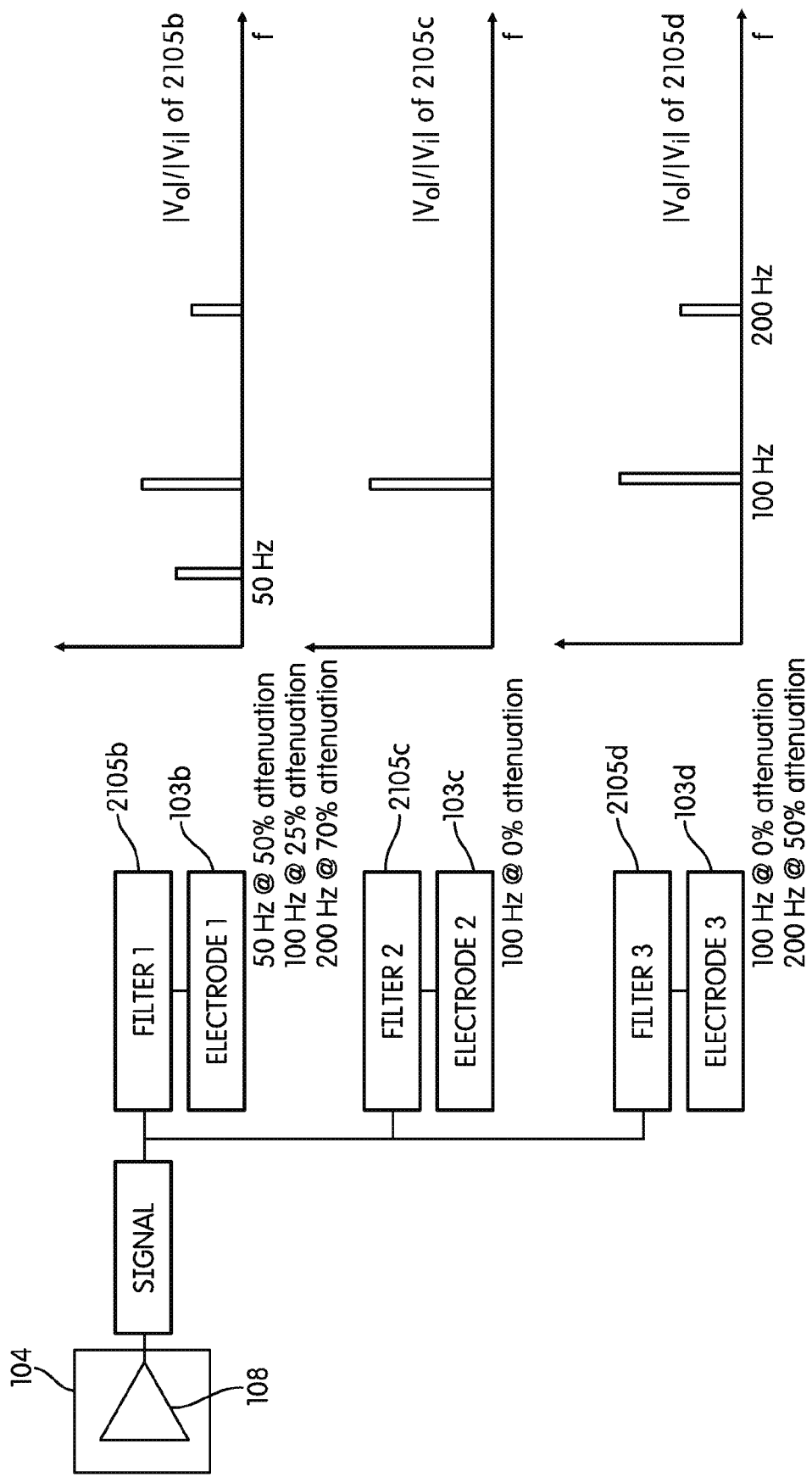

FIG. 5B shows an embodiment in which some frequency filter units may have respective sets of pass-through frequency bands. More specifically, the embodiment of FIG. 5 includes a frequency filter unit 2105b that has a respective set of pass-through frequency bands that includes a band centered around 50 Hz, a band centered around 100 Hz, and a band centered around 200 Hz. Frequency filter unit 2105d has a respective set of pass-through frequency bands that includes a band also centered around 100 Hz and another band also centered around 200 Hz. Frequency filter unit 2105c has a single respective pass-through frequency band also centered around 100 Hz. In the embodiment depicted in FIG. 5B, the respective pass-through frequency band (of filter unit 2105c) or respective sets of pass-through frequency bands (of filter units 2105b and 2105d) have partial overlap in frequency (e.g., at 100 Hz and 200 Hz). In another embodiment, a plurality of frequency filter units may have respective pass-through frequency bands or respective sets of pass-through frequency bands that do not overlap in frequency.

In an embodiment, control unit 110 may be configured to use the frequency filter units 2105b, 2105c, and 2105d to cause only a subset of one or more electrodes of the set of electrodes 103b, 103c, and 103d to output one or more respective ESF effects with a first drive signal. For instance, the control unit may generate the first drive signal with only a frequency component of 200 Hz. In that instance, only electrodes 103b and 103d will output respective ESF effects with the first drive signal. In an embodiment, the control unit may be configured to cause at least two electrodes of electrodes 103b, 103c, and 103d to output respective ESF effects with the first drive signal, but to do so in different manners. For instance, the first drive signal with the 200 Hz frequency component may be attenuated by 70% by frequency filter unit 2105b, and may be attenuated by 50% by frequency filter unit 2105d. Thus, the two respective electrodes 103b and 103d may receive the first drive signal with different levels of attenuation, and thus output respective ESF effects with the first drive signal in different manners. In another example, the first drive signal may include frequency components of only 100 Hz and 200 Hz. As shown in FIG. 5B, the frequency filter unit 2105c will filter out the 200 Hz component of the first drive signal, while the frequency filter units 2105b and 2105d will not. Accordingly, electrodes 103b and 103d are driven by the 100 Hz and the 200 Hz frequency components of the first drive signal, while electrode 103c is driven by only the 100 Hz frequency component of the first drive signal. Thus, the three electrodes 103b, 103c and 103d may output respective ESF effects with the first drive signal in different manners, because the three electrodes are driven by different combinations of frequency components and provide different levels of attenuation.

Figure 6A:
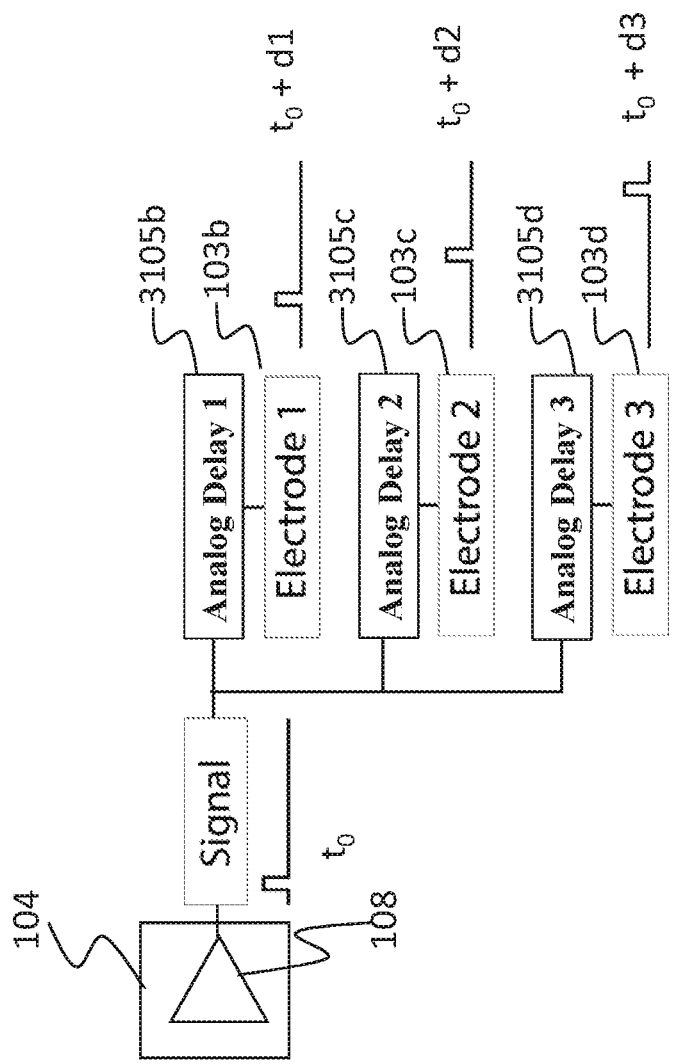
FIG. 6A is a schematic representation of a plurality of delay elements connected to a signal generating circuit in a parallel fashion, according to an embodiment herein.

FIG. 6A depicts an embodiment in which gating elements thereof are a plurality of delay elements 3105b-3105d, respectively. Each delay element of delay elements 3105b-3105d may be configured to control a timing by which a respective electrode of electrodes 103b-103d will output a respective ESF effect. A delay element may control this timing by introducing a different respective period of delay of a drive signal from an output of the signal generating circuit 104 to the respective electrode. In an embodiment, each of the delay elements may be an analog delay element, such as an inductive and/or capacitive filter (e.g., a LC filter). In another embodiment, each of the delay elements may be a digital delay element, such as a buffer. In FIG. 6A, delay element 3105$b$ may be configured to introduce a delay "d1" (e.g., 500 msec), delay element 3105$c$ may be configured to introduce a delay "d2" (e.g., 700 msec), and delay element 3105$d$ may be configured to introduce a delay "d3" (e.g., 900 msec) to a drive signal. In the embodiment of FIG. 6A, a delay in traversing a physical distance from the signal generating circuit 104 to a particular electrode may be considered negligible. The delay elements 3105$b$, 3105$c$, and 3105$d$ may be configured to cause the electrodes 103$b$, 103$c$, and 103$d$ to output respective ESF effects in a sequence, at $t_0$+d1, $t_0$+d2, and at $t_0$+d3, respectively. In an embodiment, d1, d2, and d3 increase in value in a linear fashion. For instance, d2=2×d1, while d3=3×d1. The delay elements 3105$b$, 3105$c$, and 3105$d$ may then cause the electrodes 103$b$, 103$c$, and 103$d$ to output respective ESF effects in a sequence, at $t_0$+d1, $t_0$+2d1, and at $t_0$+3d1. The sequential output of ESF effects across electrodes 103$b$, 103$c$, and 103$d$ may provide the sensation of flow described above.

Figure 6B:
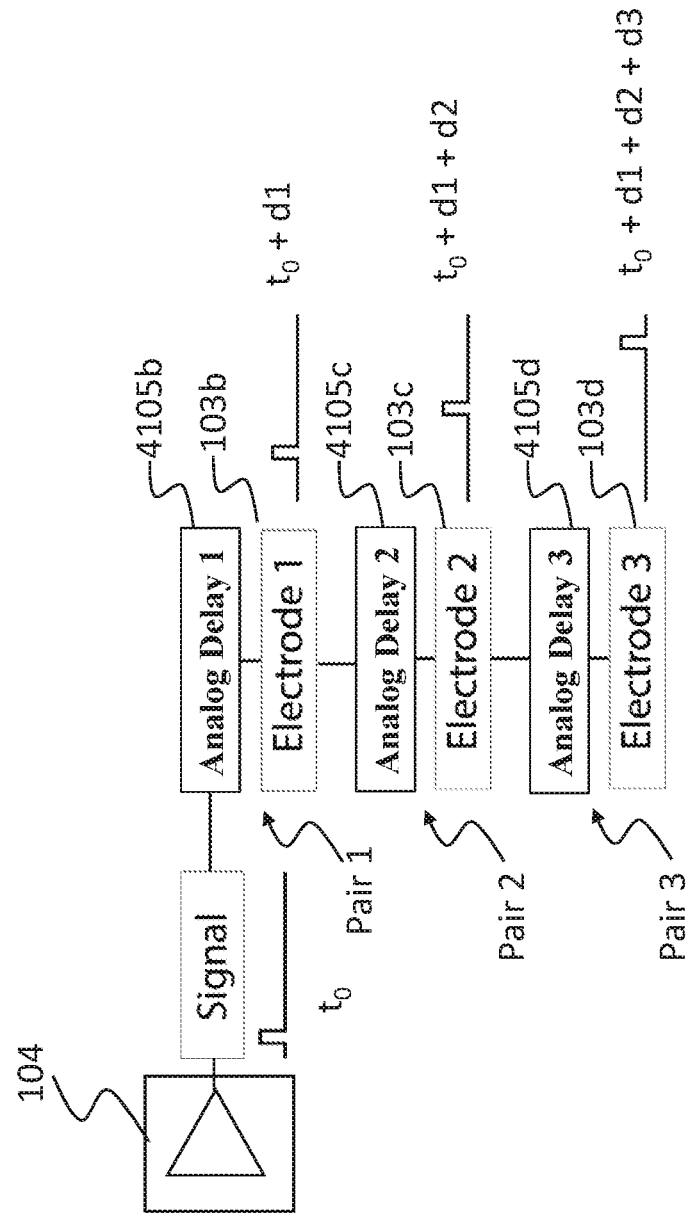
FIG. 6B is a schematic representation of a plurality of delay elements connected to each other in a series fashion, according to an embodiment herein.

While FIG. 6A illustrates an embodiment in which a plurality of delay elements 3105$b$, 3105$c$, and 3105$d$ may each be connected to an output of the signal generating circuit 104 in a parallel configuration, FIG. 6B illustrates an embodiment in which a plurality of delay elements 4105$b$, 4105$c$, and 4105$d$ are connected to each other in a series fashion to form a chain of delay elements so that a drive signal propagates through the chain of delay elements. More specifically, FIG. 6B depicts an interface device that includes delay elements 4105$b$, 4105$c$, and 4105$d$ and respective ESF electrodes 103$b$, 103$c$, and 103$d$ that operably correspond to the delay elements. Delay elements 4105$b$, 4105$c$, and 4105$d$ may be configured to introduce delays of d1, d2, and d3, respectively, from an input of the delay element to an output of the delay element. The delay elements may be spatially arranged as a line or other array of delay elements, and the electrodes may be spatially arranged as a line or other array of electrodes. Each of the electrodes 103$b$, 103$c$, 103$d$ may be electrically connected to an output of a respective delay element. FIG. 6B further includes a signal generating circuit 104 that is configured to generate a drive signal.

As shown in FIG. 6B, the delay elements 4105$b$, 4105$c$, and 4105$d$ and their respective electrodes 103$b$, 103$c$, 103$d$ may form or otherwise be grouped into respective pairs that each includes a respective delay element and a respective electrode. For instance, delay element 4105$b$ and electrode 103$b$ may form a pair 1, delay element 4105$c$ and electrode 103$c$ may form a pair 2, and delay element 4105$d$ and electrode 103$d$ may form a pair 3. The pairs of delay elements and electrodes (e.g., pair 1, pair 2, and pair 3) may be electrically connected in series. In an embodiment, the pair 1 may be a first pair in the series, the pair 2 may be a second pair in the series, and the pair 3 may be a third pair in the series. By being connected in series, an input of a delay element of a first pair in the series (i.e., an input of delay element 4105$b$) may be connected to an output of the signal generating circuit 104, while an input of a delay element of all other pairs in the series is electrically connected to an electrode of a previous pair in the series. Thus, an input of a delay element of the second pair in the series (input of delay element 4105$c$) may be connected to an electrode of the first pair in the series (electrode 103$b$), while an input of a delay element of the third pair in the series (input of delay element 4105$d$) may be connected to an electrode of the second pair in the series (electrode 103$c$). With this arrangement, a drive signal may propagate through the series of delay elements and electrodes to sequentially output ESF effects along the electrodes. Each electrode may experience a cumulative delay of its delay element and of delay elements in previous pair of the series. Thus, electrode 103$b$ may experience a delay of d1, electrode 103$c$ may experience a delay of d2+d1, and electrode 103$d$ may experience a delay of d3+d2+d1. In an embodiment, d1=d2=d3. In an embodiment, at least some or all of d1, d2, and d3 have different values.

In an embodiment, each of the delay elements in FIGS. 6A and 6B is configured to introduce a respective period of delay, a time delay or period of delay, to a drive signal from an input of the delay element to an output of the delay element. The delay elements may be configured to introduce the same period of delay, or to introduce different respective periods of delay.

In an embodiment, each of the delay elements in FIGS. 6A and 6B may have a fixed delay, or may have a reconfigurable delay. For instance, each delay element may be a capacitor with a fixed capacitance, or a reconfigurable capacitance.

Figure 7:
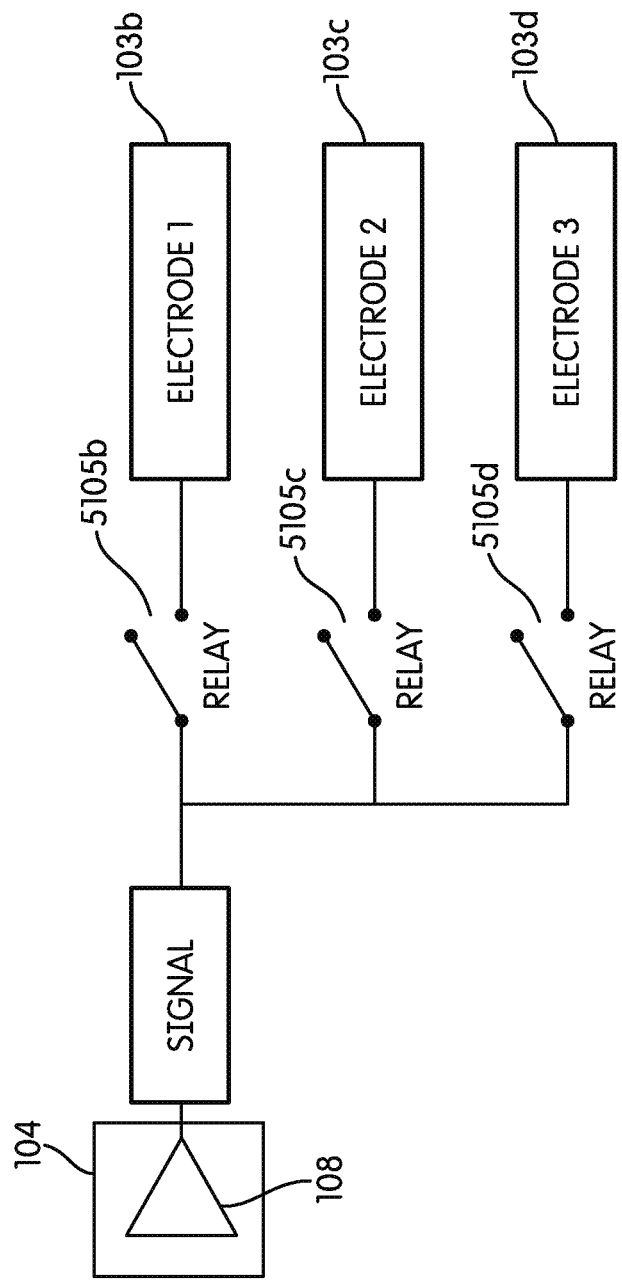
FIG. 7 is a schematic representation of a plurality of gating elements that are relay switches, according to an embodiment herein.

FIG. 7 depicts an embodiment in which a plurality of gating elements are relay switches 5105$b$-5105$d$. The relay switches may be controlled by, e.g., the control unit 110 in FIG. 4A. In an embodiment, the control unit 110 may be configured to close only one relay switch of all the relay switches that are being used as gating elements, and to leave all other relay switches open. In an embodiment, the control unit 110 may be configured to close multiple relay switches at the same time, and to leave open other relay switches being used as gating elements. In an embodiment, each of the relay switches 5105$b$-5105$c$ may be a high voltage relay switch configured to withstand a voltage (e.g., 1 kV) used to generate static ESF effects. When a particular switch is in an open state as shown in FIG. 7, an electrode connected to the switch may be in an electrically floating state.

Figure 8A:
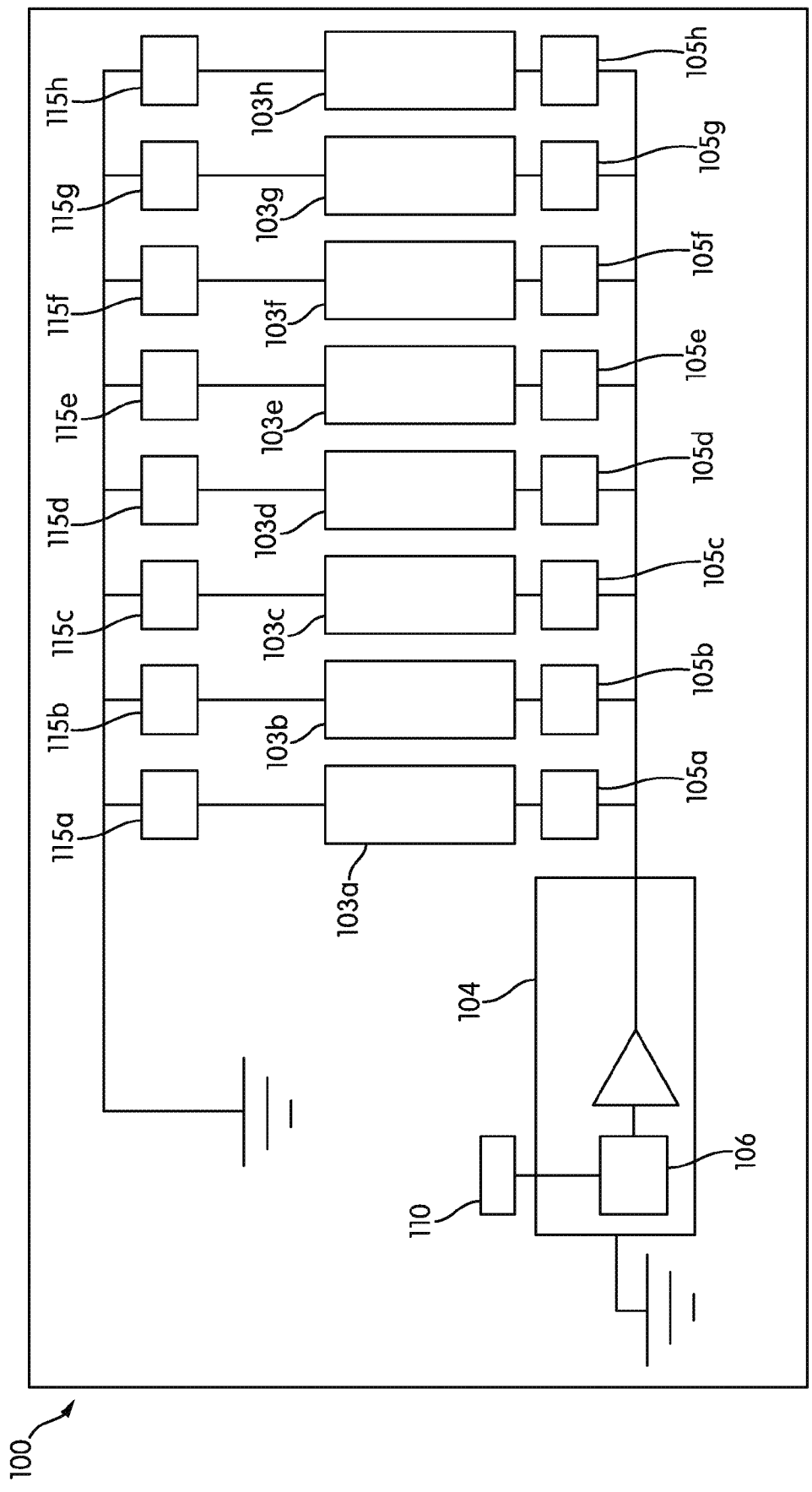
FIGS. 8A and 8B are schematic representations of an interface device having a plurality of gating elements connected between respective electrodes and a ground potential, according to an embodiment herein.

As discussed above, generating an ESF effect may involve a signal electrode and a ground electrode. An insulated electrode may be usable as a signal electrode at one point in time by being electrically connected to an output of a signal generating circuit, and as a ground electrode at another point in time by being electrically connected to a ground potential. FIG. 8A schematically represents an embodiment in which each electrode of electrodes 103$a$-103$g$ may be an insulated electrode switchable between being a signal electrode and being a ground electrode. More specifically, FIG. 8A shows a signal generating circuit 104, a control unit 110, a plurality of electrodes 103$a$-103$g$ (e.g., insulated electrodes), and gating elements 105$a$-105$h$, similar to FIG. 4A. However, FIG. 8A further shows a plurality of gating elements 115$a$-115$h$ that are each electrically connected to a ground potential. In one example, while gating elements 105$a$-105$h$ may control which subset of electrodes will receive a drive signal from the signal generating circuit 104, the gating elements 115$a$-115$h$ may be configured to ground those electrodes that are not receiving a drive signal or not intended to receive the drive signal.

Figure 8B:
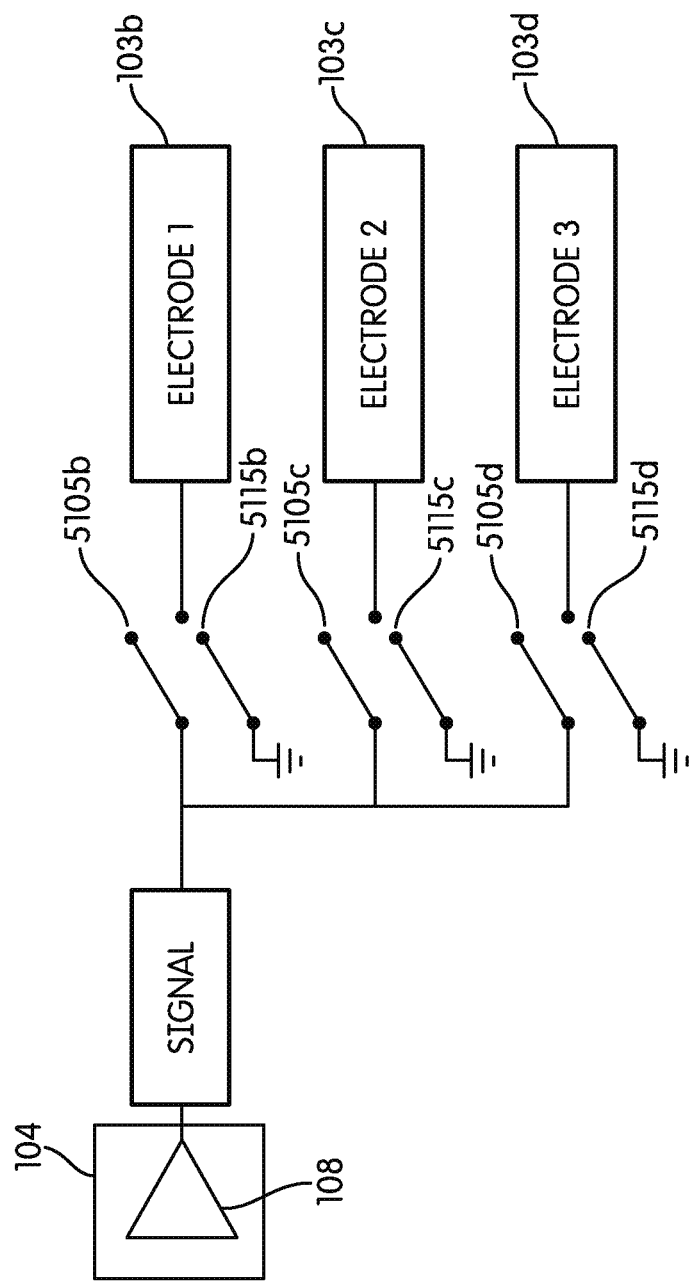

In an embodiment depicted in FIG. 8B, an electrode may be grounded rather than be left in an electrically floating state when its respective gating element is in an open state. In the embodiment of FIG. 8B, the gating elements 5115$a$-5115$h$ are relay switches, and more particularly, include a first plurality of relay switches 5105$b$, 5105$c$, 5105$d$, and a second plurality of relay switches 5115$b$, 5115$c$, 5115$d$. The gating elements may form pairs, such as a first pair of switches 5105*b*, 5115*b*, a second pair of switches 5105*c*, 5115*c*, and a third pair of switches 5105*d*, 5115*d*. In an embodiment, each of the relay switches may be controlled by the control unit 110. Each of the relay switches 5105*b*, 5105*c*, 5105*d* may be operably controlled to selectively connect a corresponding electrode to an output of the signal generating circuit 104, while each of the relay switches 5115*b*, 5115*c*, and 5115*d* may be operably controlled to selectively connect the corresponding electrode to ground. The pairs of relay switches may be configured or controlled so that exactly one relay switch in each pair will be closed during operation of the haptic interface device. This way, if an electrode is not electrically connected to the output of a signal generating circuit, the electrode is grounded rather than left in an electrically floating state.

Figure 9:
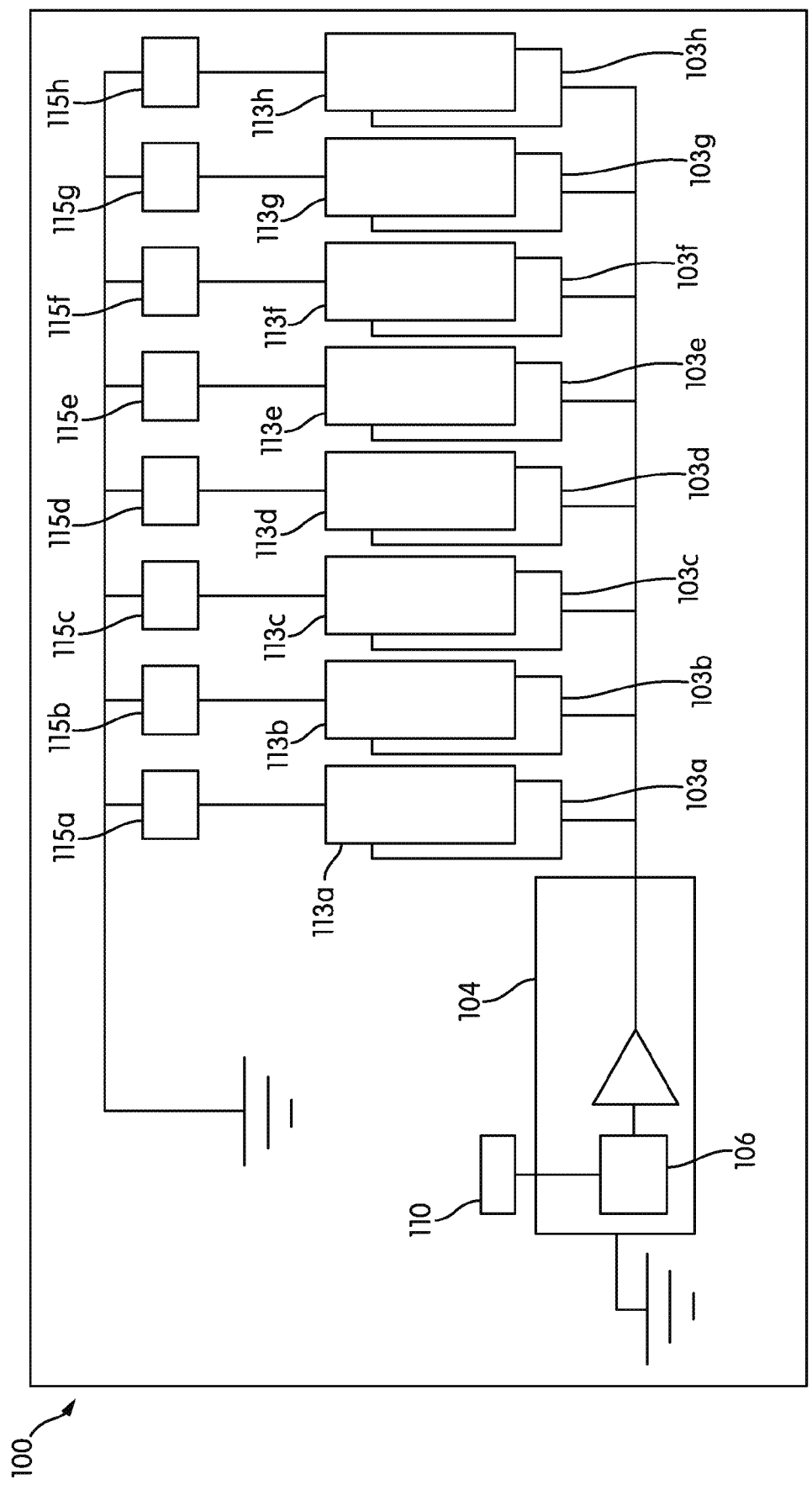
FIG. 9 is a schematic representation of a plurality of shielding elements of a shielding layer that are configured to shield respective electrodes from a surface of an interface device, according to an embodiment herein.

FIG. 9 provides an embodiment in which a plurality of shielding elements 113*a*-113*h* may control which electrodes 103*a*-103*h* output an ESF effect with a first drive signal. The shielding elements 113*a*-113*h* may be combined with the gating elements 105*a*-105*h* in FIG. 4A, but also allows such gating elements to be omitted such that each of the electrodes 103*a*-103*h* receives a drive signal(s) from the signal generating circuit 104. In an embodiment, each of the electrodes 103*a*-103*h* may be an insulated electrode that is disposed behind an outer surface of a haptic enabled interface device. The plurality of shielding elements 113*a*-113*h* may be disposed in front of (on top of or above) respective electrodes 103*a*-103*h*, such that the shielding elements 113*a*-113*h* are located between the electrodes 103*a*-103*h* and an outer surface of the interface device. For example, the shielding element 113*a*-113*h* may be conductive pads (e.g., metal pads) buried slightly behind (below) an outer surface of the interface device, but at a shallower depth compared to the electrodes 103*a*-103*h*. In an embodiment, each shielding element of the shielding elements 113*a*-113*h* may have the same dimensions as a respective electrode of the electrodes 103*a*-103*h*, and may be disposed directly in front of (e.g., directly above) the respective electrode.

In an embodiment, each shielding element of the shielding elements 113*a*-113*h* is switchably connectable to ground, via a respective gating element (e.g., switch) of the gating elements 115*a*-115*h*, which may be controlled by the control unit 110. In this embodiment, each of the electrodes 103*a*-103*h* may be electrically connected to an output of a signal generating circuit 104. Each of the electrodes 103*a*-103*h* may generate an electric field based on the drive signal. A shielding element (e.g., 113*b*) of the shielding elements 113*a*-113*h* may suppress the electric field emanating from a respective electrode (e.g., 103*b*) by being switchably connected to ground, such as via a respective gating element (e.g., 115*b*) of the gating elements 115*a*-115*h*. When the shielding element is electrically connected to ground, it may block the electric field of a respective electrode from reaching an outer surface of the interface device. Thus, this shielding element may prevent the corresponding electrode (e.g., 103*b*) from generating an ESF effect with the drive signal. Another electrode (e.g., 103*c*) may be allowed to generate an ESF effect with the drive signal by having its respective shielding element (e.g., 113*c*) electrically disconnected from ground. Shielding elements are discussed in more detail in U.S. application Ser. No. 15/239,464, filed on Aug. 17, 2016, the content of which is incorporated by reference herein in its entirety.

Figure 10:
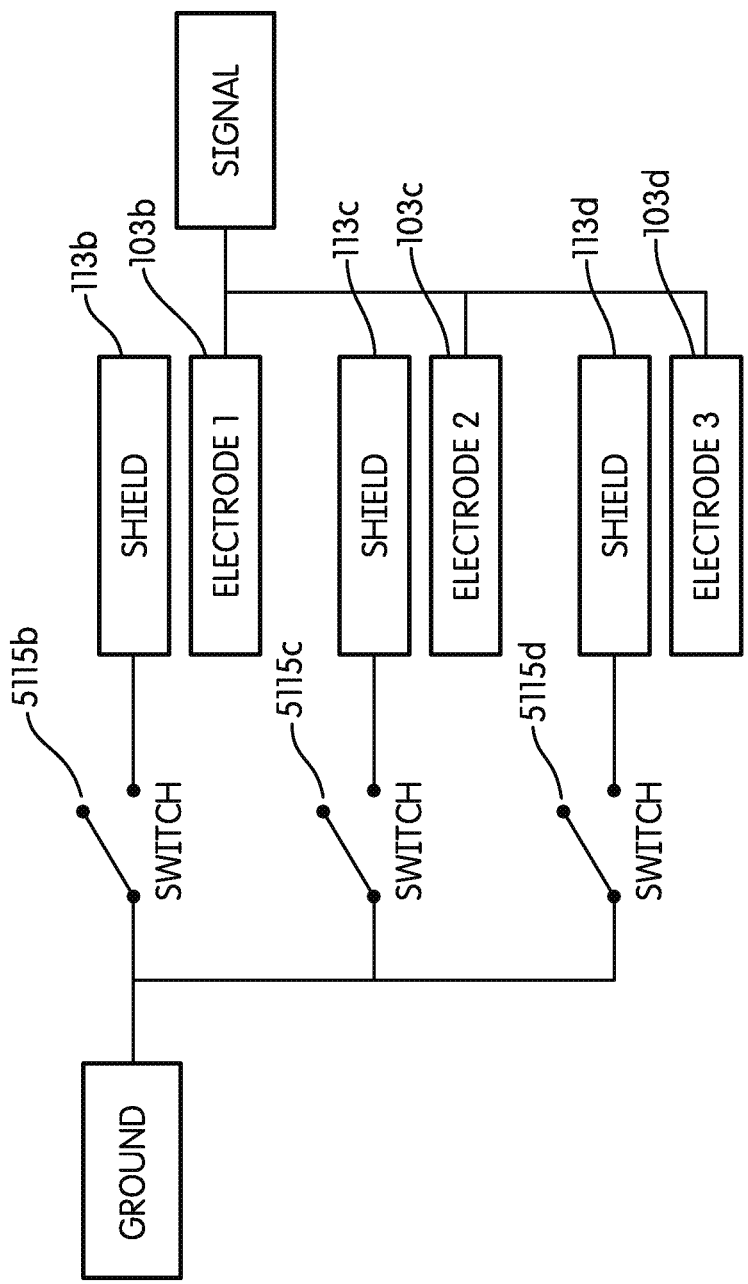
FIG. 10 is a schematic representation of a plurality of shielding elements that are configured to shield respective electrodes from a surface of an interface device, according to an embodiment herein.

FIG. 10 depicts an embodiment in which the gating elements that switchably connect shielding elements to ground are relay switches 5115*b*-5115*d*, respectively. Any of the relay switches may be closed to electrically connect a respective shielding element to ground, or may be opened to electrically disconnect the respective shielding element from ground.

Figure 11B:
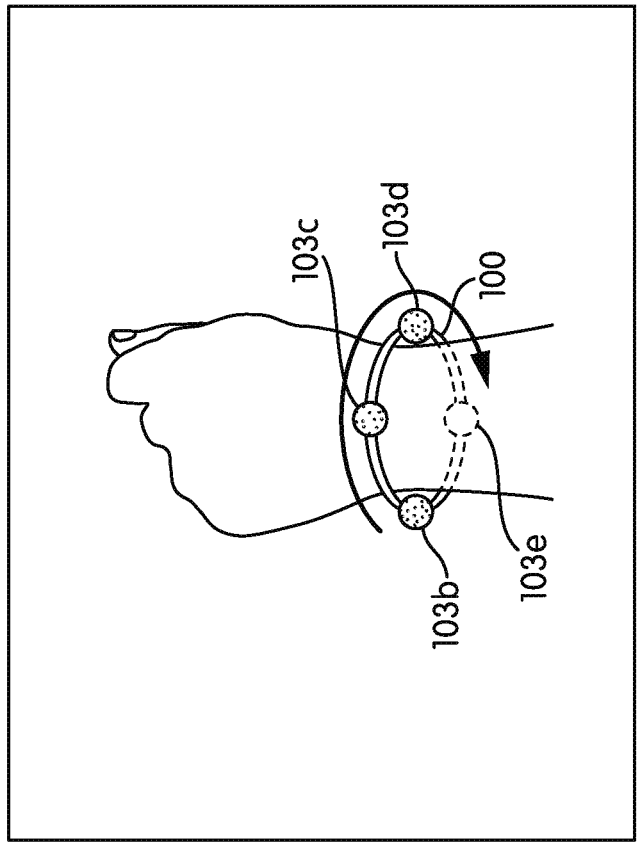
FIGS. 11A and 11B illustrate a plurality of electrodes being used to convey a spatial or temporal relationship, according to an embodiment herein.
Figure 11A:
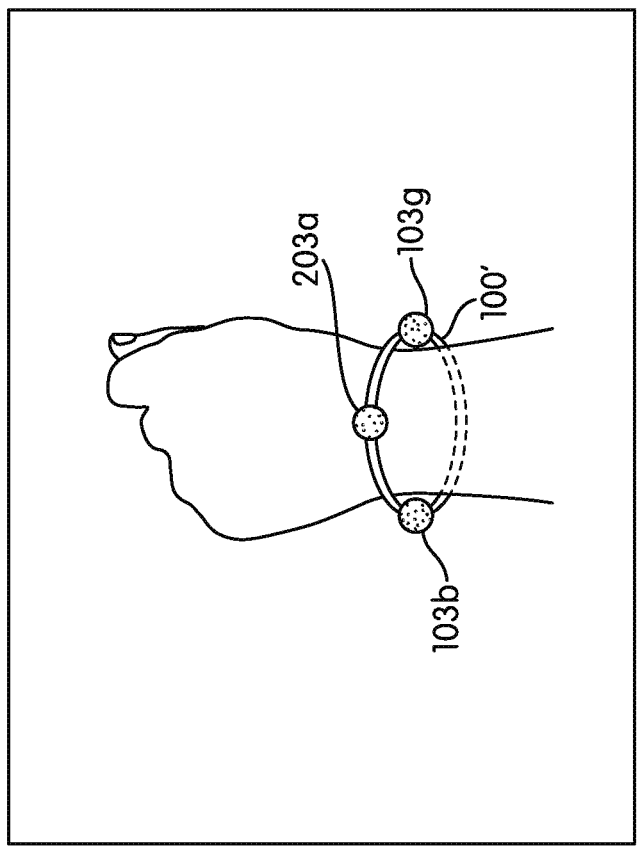

FIGS. 11A and 11B depict embodiments in which the plurality of electrodes shown above (e.g., electrodes 103*a*-103*h* or 203*a*-203*e*) are used to provide spatial feedback and/or temporal feedback (which may be referred to generally as spatio-temporal feedback) with ESF effects. In an embodiment, spatial feedback may indicate a spatial orientation of a haptic interface device relative to a location of interest. The location of interest may be a particular final destination (e.g., a friend's house) or intermediate destination (e.g., a highway on-ramp), a location of an event (e.g., a concert), or any other location of interest, such as a location of an object (e.g., a car). The spatial feedback may indicate, for instance, a direction of a location of interest relative to a haptic enabled interface device (or relative to a user wearing the device). For example, FIG. 11A shows a haptic enabled interface device 100' which may include at least electrodes 103*b* and 103*g* from FIG. 1A and electrode 203*a* from FIG. 1B. If the location of interest is to the left of (or, e.g., to the west of) the device 100', electrode 103*b* may output an ESF effect with a drive signal. If the location of interest is to the front of (or, e.g., to the north of) the device 100', electrode 203*a* may output an ESF effect with the drive signal. If the location of interest is to the right (or, e.g., to the east of) the device 100', electrode 103*g* may output an ESF effect with the drive signal. In an embodiment, a direction that constitutes front (or left or right) may be based on a direction that a user is facing. The direction that the user is facing may be determined when the device 100' is worn or being held. This determination may use, e.g., any integrated motion sensor (e.g., accelerometer or gyroscope), any integrated compass, or any integrated global positioning system (GPS). In an embodiment, the selection of which electrode(s) will represent a particular direction or orientation may be predetermined and fixed. In an embodiment, such a selection may be re-configurable, and may be based on how the device (e.g., 100') is worn or held.

FIG. 11B depicts an embodiment of producing spatial feedback that may be sensed as a flow. More specifically, FIG. 11B depicts the wearable interface device 100 of FIG. 1A that includes at least electrodes 103*b*, 103*c*, 103*d*, and 103*e* spatially arranged in a line or other array. The electrodes 103*b*, 103*c*, 103*d*, and 103*e* may sequentially output respective ESF effects in a clockwise order around a user's wrist, or in a counterclockwise order around the user's wrist to provide a feeling of flow to the user in corresponding clockwise or counterclockwise direction. The clockwise direction may indicate, e.g., a rightward direction (e.g., the user needs to move to the right), while the counterclockwise direction may indicate, e.g., a leftward direction (e.g., the user needs to move to the left).

In an embodiment, the sense of flow may be created with one drive signal, or with multiple drive signals. For example, the sense of flow may be created with one drive signal and the multiple delay elements shown in FIG. 6A or 6B. The delay elements may allow a drive signal to propagate to electrode 103*b* at a first time (e.g., $t_0+d$) to generate a first ESF effect, allow the drive signal to propagate to electrode 103*c* at a second time (e.g., $t_0+2d$) to generate a second ESF effect, allow the drive signal to propagate to electrode 103*d* at a third time (e.g., $t_0+3d$) to generate a third ESF effect, and to propagate to electrode 103*e* at a fourth time (e.g., $t_0+4d$) to generate a fourth haptic effect.

In another example, the sense of flow may be created with multiple drive signals and the frequency filter units or relay switches shown in FIGS. 5A, 5B, and FIG. 7. For instance, a first drive signal may be generated at a first time (e.g., $t_0+d$) and be applied to only electrode 103b by blocking the first drive signal from all other electrodes, using the frequency filter units or relay switches. Then, a second drive signal may be generated at a second time (e.g., $t_0+2d$) and be applied to only electrode 103c by blocking the second drive signal from all other electrodes. This process may be repeated for at least a third drive signal (applied to only electrode 103d) and a fourth drive signal (applied to only electrode 103e).

In an embodiment, creating or producing a sense of flow may be used to convey a temporal relationship between a current time and an event of interest (e.g., a temporal relationship between a current time and a meeting), as discussed above. In an embodiment, creating or producing a sense of flow may be used to convey information such as the status of an operation.

In an embodiment, the gating elements discussed above may be used to create particular ESF effects by implementing a sequence of at least a first electrode, a second electrode, and a third electrode, in which the second electrode is a middle electrode, and the first and third electrodes are immediately next to the middle electrode and on opposite sides of the middle electrode. For instance, in order to generate a particular ESF effect, the gating elements may allow a drive signal to reach the first electrode and the second electrode, but not the third electrode.

Figure 12:
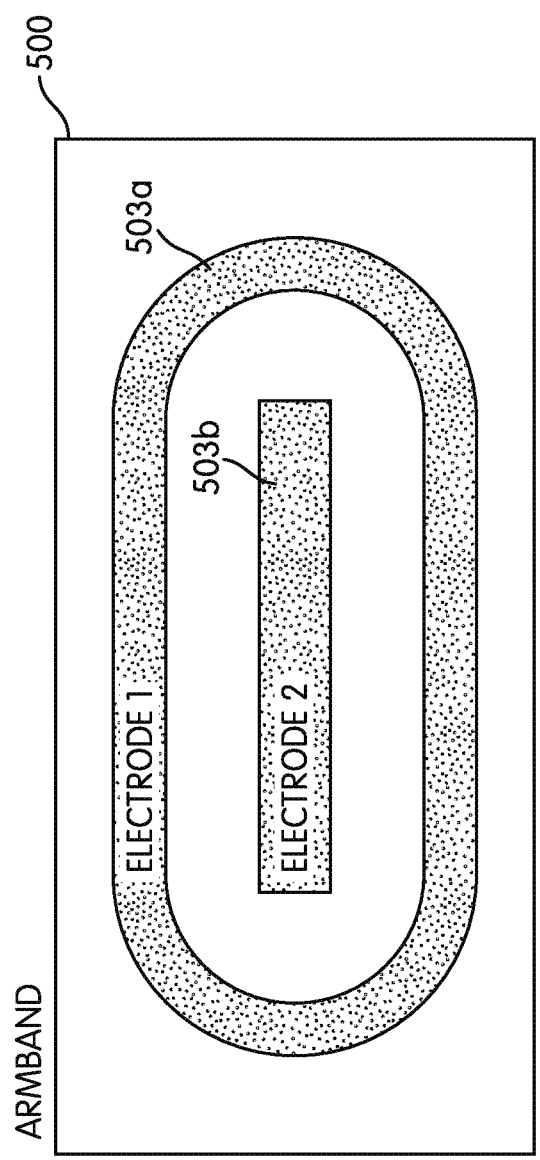
FIG. 12 illustrates an example layout of a plurality of electrodes for generating respective ESF effects, according to an embodiment herein.
Figure 13:
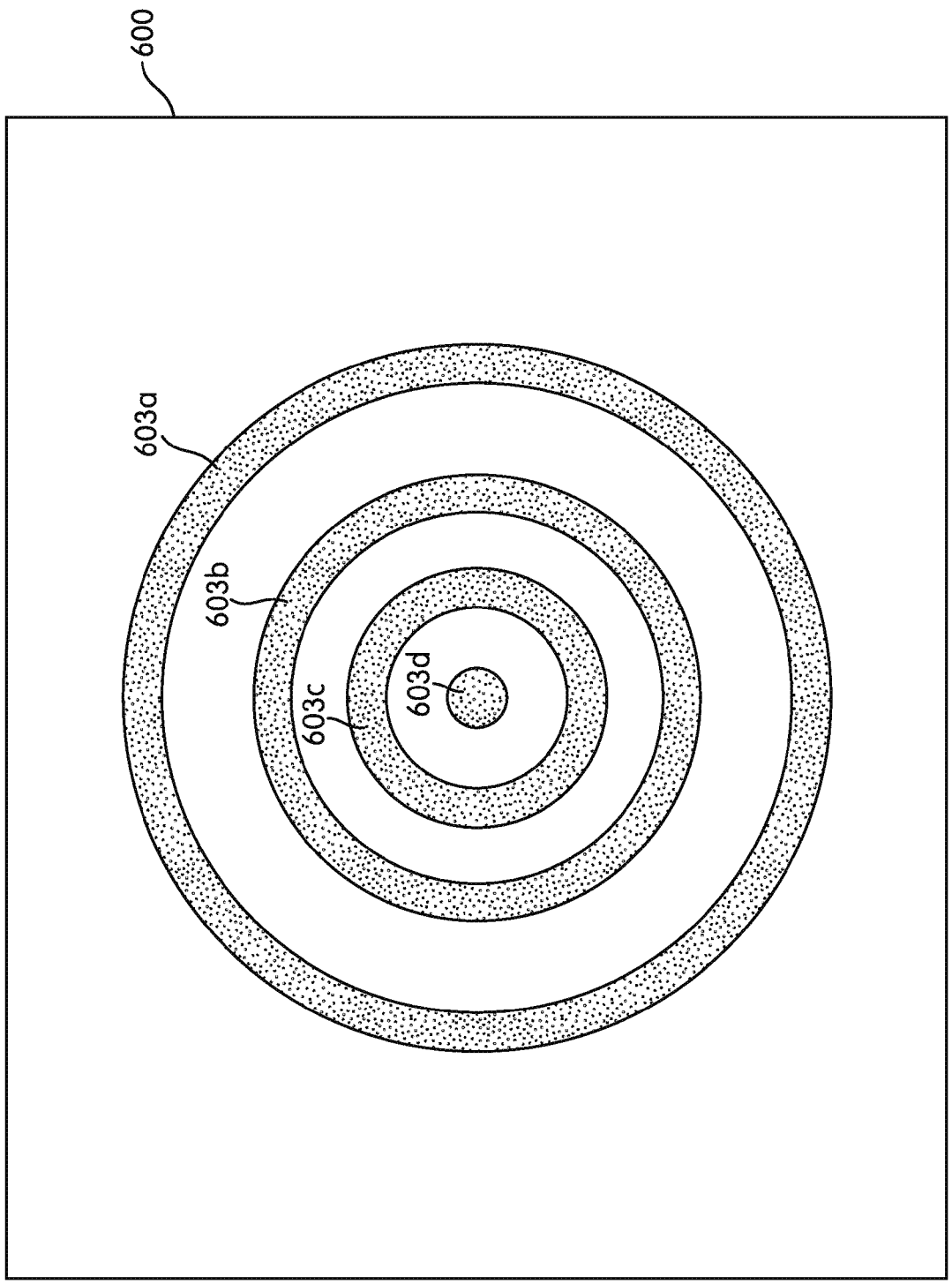
FIG. 13 illustrates an example layout of a plurality of electrodes for generating respective ESF effects, according to an embodiment herein.

FIGS. 12 and 13 illustrate other embodiments of shapes and arrangements of electrodes (e.g., static ESF electrodes) used to generate ESF effects for a haptic interface device. FIG. 12 shows a haptic enabled interface device 500 that is an armband. The device 500 may include an electrode 503a shaped as an ellipse that is disposed at a surface of the device 500, and an electrode 503b shaped as a line or bar that is disposed at the surface of the device 500. As shown in FIG. 12, the electrode 503a may surround the electrode 503b. FIG. 13 shows a haptic interface device 600 that has a plurality of electrodes 603a, 603b, 603c, 603d that are arranged as concentric circles and disposed at a surface of the haptic enabled interface device 600. The arrangement of the electrodes may allow them to sequentially create respective ESF effects that create an impression of inward or outward flow.

As discussed above, the array of static ESF electrodes may have a variety of shapes and arrangements, such as long strips (e.g., disposed over the length of a bracelet), small dots (e.g., all over the surface of a phone), or a 2D array of large squares (e.g., on the back of a tablet computer). In an embodiment, long strips and larger pads may provide better static ESF effects than smaller electrodes, because they are less likely to be completely covered by a user's skin.

Embodiments herein may be used for a mobile phone, gaming, automotive, augmented reality (AR), virtual reality (VR), or wearables application. For example, the handheld interface device may be a controller for a VR or AR application. In an embodiment, the electrodes may be used to expand the expressivity of static ESF feedback by producing a variety of spatial and/or temporal effects.

Embodiments herein may be used for dynamic ESF effects or static ESF effects. For static ESF effects, the drive signal applied to the selected subset of the plurality of electrodes may have an amplitude of at least 1 kV.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An interface device configured to provide an electrostatic friction (ESF) effect, the interface device comprising:
   a plurality of electrodes disposed at a surface of the interface device;
   a signal generating circuit configured to generate a first drive signal at an output of the signal generating circuit;
   a plurality of frequency filter units or delay elements electrically connected to the signal generating circuit and to the plurality of electrodes, such that each electrode of the plurality of electrodes is electrically connected to an output of a respective frequency filter unit or delay element, and wherein an input of the respective frequency filter unit or delay element is electrically connected to the output of the signal generating circuit; and
   a control unit configured to use the plurality of frequency filter units or delay elements: (i) to cause only a subset of one or more electrodes of the plurality of electrodes to output one or more respective ESF effects with the first drive signal, or (ii) to cause at least two electrodes of the plurality of electrodes to output respective ESF effects with the first drive signal in different respective manners.

2. The interface device of claim 1, wherein the interface device comprises the plurality of frequency filter units, wherein each of the plurality of frequency filter units has a respective pass-through frequency band or a respective set of pass-through frequency bands, and is configured to block any frequency component of the first drive signal which is outside the respective pass-through frequency band or respective set of pass-through frequency bands, wherein the respective pass-through frequency bands or respective sets of pass-through frequency bands of the plurality of frequency filter units do not overlap in frequency, or only partially overlap in frequency.

3. The interface device of claim 2, wherein the control unit is configured to cause the signal generating circuit to generate the first drive signal with only a frequency component that is (i) within the respective pass-through frequency band or respective set of pass-through frequency bands of a respective frequency filter unit of a first electrode and (ii) outside the respective pass-through frequency bands or respective sets of pass-through frequency bands of the remainder of the plurality of frequency filter units of the remainder of the plurality of electrodes of the interface device, such that the plurality of frequency filter units causes only the first electrode of the plurality of electrodes to output an ESF effect with the first drive signal.

4. The interface device of claim 2, wherein:
   each of the plurality of frequency filter units has only a single respective pass-through frequency band, and the respective pass-through frequency bands of the plurality of frequency filter units do not overlap in frequency, or each of the plurality of frequency filter units has a respective set of pass-through frequency bands, and the respective sets of pass-through frequency bands of the plurality of frequency filter units have partial overlap in frequency.

5. The interface device of claim 2, wherein the plurality of frequency filter units comprise a first frequency filter unit configured to pass the first drive signal to a first electrode of the plurality of electrodes with a first attenuation level, and comprises a second frequency filter unit configured to pass the first drive signal to a second electrode of the plurality of electrodes with a second attenuation level different than the first attenuation level, and wherein the interface device is configured to cause the first electrode and the second electrode to output respective ESF effects with the first drive signal with different respective intensity levels.

6. The interface device of claim 2, wherein the plurality of frequency filter units comprise a first frequency filter unit configured to pass the first drive signal to a first electrode of the plurality of electrodes with a first phase shift that creates a first period of delay, and comprises a second frequency filter unit configured to pass the first drive signal to a second electrode of the plurality of electrodes with a second phase shift that creates a second period of delay different than the first period of delay, and wherein the interface device is configured to cause the first electrode and the second electrode to output respective ESF effects with the first drive signal at different respective times.

7. The interface device of claim 2, wherein the control unit is configured to determine a spatial relationship between the interface device and a determined location, or to determine a temporal relationship between a current time and a determined event, and is configured to select the subset of one or more electrodes to convey the spatial relationship or the temporal relationship.

8. The interface device of claim 1, wherein
the interface device comprises the plurality of frequency filter units,
the first drive signal is one of a plurality of drive signals the signal generating circuit is configured to generate in different respective time periods or in response to different signal generating commands, and
the control unit is configured to cause the plurality of frequency filter units to pass the plurality of drive signals to different respective electrodes of the plurality of electrodes.

9. The interface device of claim 8, wherein the plurality of electrodes are arranged as an array of electrodes, and wherein the control unit is configured to use the plurality of frequency filter units to cause the array of electrodes to sequentially output respective ESF effects with the respective drive signals to create an impression of flow along the array of electrodes.

10. The interface device of claim 1, wherein the interface device comprises the plurality of delay elements, wherein the plurality of delay elements are configured to control a timing by which each electrode of the plurality of electrodes will output an ESF effect by introducing different respective periods of delay of the first drive signal from an input of the respective delay element to an output of the respective delay element.

11. The interface device of claim 1, wherein the plurality of electrodes is arranged in an array in which the plurality of electrodes has uniform spacing between adjacent electrodes.

12. The interface device of claim 11, wherein the array is a two-dimensional array.

13. The interface device of claim 1, wherein the interface device is a wearable device.

14. The interface device of claim 1, wherein the signal generating circuit comprises an amplifier circuit configured to amplify a first signal to the first drive signal, wherein the amplifier circuit is the only amplifier circuit in the interface device for amplifying the first signal to the first drive signal.

15. The interface device of claim 1, wherein the control unit is configured to select the subset of one or more electrodes from among a set of electrodes of the plurality of electrodes that are receiving user contact, such that some electrodes receiving user contact are not selected to generate a respective ESF effect with the first drive signal.

16. An interface device configured to provide an electrostatic friction (ESF) effect, the interface device comprising:
a signal generating circuit configured to generate a first drive signal at an output of the signal generating circuit;
a plurality of delay elements configured to introduce respective periods of delay to the first drive signal from an input of the respective delay element to an output of the respective delay element; and
a plurality of electrodes corresponding to the plurality of delay elements, wherein each of the plurality of electrodes is connected to the output of the respective delay element and is configured to generate a respective ESF effect with the first drive signal,
wherein the plurality of delay elements and their respective electrodes form a plurality of respective pairs that each includes a respective delay element and a respective electrode, and
wherein the plurality of pairs of delay elements and their respective electrodes are electrically connected in series such that an input of a delay element of a first pair in the series is connected to the output of the signal generating circuit, and an input of a delay element of all other pairs in the series is electrically connected to an electrode of a previous pair in the series.

17. The interface device of claim 16, wherein the respective periods of delay introduced by the plurality of delay elements are the same.

18. The interface device of claim 16, wherein the respective periods of delay introduced by the plurality of delay elements are all different.

* * * * *